United States Patent
Lawrence

(10) Patent No.: US 11,055,120 B2
(45) Date of Patent: Jul. 6, 2021

(54) COMPUTER ARCHITECTURE FOR EMULATING A CONTROL NODE IN CONJUNCTION WITH STIMULUS CONDITIONS IN A CORRELITHM OBJECT PROCESSING SYSTEM

(71) Applicant: BANK OF AMERICA CORPORATION, Charlotte, NC (US)

(72) Inventor: Patrick N. Lawrence, Plano, TX (US)

(73) Assignee: Bank of America Corporation, Charlotte, NC (US)

(*) Notice: Subject to any disclaimer, the term of this patent is extended or adjusted under 35 U.S.C. 154(b) by 239 days.

(21) Appl. No.: 16/405,680

(22) Filed: May 7, 2019

(65) Prior Publication Data
US 2020/0356392 A1    Nov. 12, 2020

(51) Int. Cl.
G06F 9/455    (2018.01)
G06F 16/22    (2019.01)

(52) U.S. Cl.
CPC .......... *G06F 9/455* (2013.01); *G06F 16/2291* (2019.01)

(58) Field of Classification Search
CPC ............................ G06F 9/455; G06F 16/2291
See application file for complete search history.

(56) References Cited

U.S. PATENT DOCUMENTS

| | | |
|---|---|---|
| 5,249,274 A | 9/1993 | Sztipanovits et al. |
| 5,946,673 A | 8/1999 | Francone et al. |
| 6,035,057 A | 3/2000 | Hoffman |
| 6,044,366 A | 3/2000 | Graffe et al. |
| 6,167,391 A | 12/2000 | Lawrence |
| 6,278,799 B1 | 8/2001 | Hoffman |
| 6,553,365 B1 | 4/2003 | Summerlin et al. |
| 6,941,287 B1 | 9/2005 | Vaidyanathan et al. |

(Continued)

OTHER PUBLICATIONS

Lawrence, P. N., Computer Architecture for Emulating a Node in Conjunction With Stimulus Conditions in a Correlithm Object Processing System, U.S. Appl. No. 16/405,606, filed May 7, 2019, 72 pages.

(Continued)

*Primary Examiner* — Doon Y Chow
*Assistant Examiner* — Kimberly L Jordan
(74) *Attorney, Agent, or Firm* — Michael A. Springs

(57) ABSTRACT

A device configured to emulate a correlithm object processing system includes a stimulus sensor, a memory and a control node. The stimulus sensor outputs an input stimulus correlithm object comprising an n-bit digital word. The memory stores a control table that comprises control correlithm objects and stimulus correlithm objects corresponding to various stimulus conditions. The control node is communicatively coupled to the stimulus sensor and the memory, and is configured to receive the input stimulus correlithm object and determine n-dimensional distances between the input stimulus correlithm object and each of the corresponding control correlithm objects in control table. The control node identifies the control correlithm object that has the smallest n-dimensional distance to the input stimulus correlithm object and determines that it is within a predetermined n-dimensional distance threshold. The control node outputs an output stimulus correlithm object corresponding to the identified control correlithm object.

18 Claims, 14 Drawing Sheets

(56) References Cited

U.S. PATENT DOCUMENTS

| | | |
|---|---|---|
| 6,943,686 B2 | 9/2005 | Allen |
| 6,947,913 B1 | 9/2005 | Lawrence |
| 7,015,835 B2 | 3/2006 | Lawrence et al. |
| 7,031,969 B2 | 4/2006 | Lawrence et al. |
| 7,246,129 B2 | 7/2007 | Lawrence et al. |
| 7,310,622 B2 | 12/2007 | Lawrence et al. |
| 7,349,928 B2 | 3/2008 | Lawrence et al. |
| 7,418,470 B2 | 8/2008 | Howard et al. |
| 7,526,461 B2 | 4/2009 | Srinivasa et al. |
| 7,730,121 B2 | 7/2010 | Howard et al. |
| 7,941,479 B2 | 5/2011 | Howard et al. |
| 8,412,651 B2 | 4/2013 | Paiva et al. |
| 8,521,669 B2 | 8/2013 | Knoblauch |
| 8,762,130 B1 | 6/2014 | Diaconescu et al. |
| 9,286,291 B2 | 3/2016 | Bufe et al. |
| 9,460,075 B2 | 10/2016 | Mungi et al. |
| 9,495,355 B2 | 11/2016 | Mungi et al. |
| 9,720,998 B2 | 8/2017 | Wang et al. |
| 9,721,190 B2 | 8/2017 | Vijayanarasimhan et al. |
| 9,785,983 B2 | 10/2017 | Zhao et al. |
| 10,019,650 B1 | 7/2018 | Lawrence |
| 10,037,478 B1 | 7/2018 | Lawrence |
| 10,049,305 B2 | 8/2018 | Vijayanarasimhan et al. |
| 10,169,329 B2 | 1/2019 | Futrell et al. |
| 2003/0158850 A1 | 8/2003 | Lawrence et al. |
| 2003/0172368 A1 | 9/2003 | Alumbaugh et al. |
| 2004/0044940 A1 | 3/2004 | Lawrence et al. |
| 2005/0131924 A1* | 6/2005 | Jones .................. G06F 16/283 |
| 2015/0149155 A1 | 5/2015 | Zadeh |
| 2017/0161606 A1 | 6/2017 | Duan et al. |
| 2018/0012993 A1 | 1/2018 | Cheng et al. |
| 2018/0157994 A1 | 6/2018 | Levy |

OTHER PUBLICATIONS

Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.

Lawrence, P. N., "Correlithm Object Technology," Apr. 2004, 229 pages.

* cited by examiner

COMPUTER ARCHITECTURE FOR EMULATING A CONTROL NODE IN CONJUNCTION WITH STIMULUS CONDITIONS IN A CORRELITHM OBJECT PROCESSING SYSTEM

TECHNICAL FIELD

The present disclosure relates generally to computer architectures for emulating a processing system, and more specifically to a computer architecture for emulating a control node in conjunction with stimulus conditions in a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as facial recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system can use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device can determine how similar the data samples are to each other even when the data samples are not exact matches. In addition, the device can quantify how similar data samples are to one another. The ability to determine how similar data samples are to each other is unique and distinct from conventional computers that can only perform binary comparisons to identify exact matches.

A string correlithm object comprising a series of adjacent sub-string correlithm objects whose cores overlap with each other to permit data values to be correlated with each other in n-dimensional space. The distance between adjacent sub-string correlithm objects can be selected to create a tighter or looser correlation among the elements of the string correlithm object in n-dimensional space. Thus, where data values have a pre-existing relationship with each other in the real-world, those relationships can be maintained in n-dimensional space if they are represented by sub-string correlithm objects of a string correlithm object. In addition, new data values can be represented by sub-string correlithm objects by interpolating the distance between those and other data values and representing that interpolation with sub-string correlithm objects of a string correlithm object in n-dimensional space. The ability to migrate these relationships between data values in the real world to relationships among correlithm objects provides a significant advance in the ability to record, store, and faithfully reproduce data within different computing environments. Furthermore, the use of string correlithm objects significantly reduces the computational burden of comparing time-varying sequences of data, or multi-dimensional data objects, with respect to conventional forms of executing dynamic time warping algorithms. The reduced computational burden results in faster processing speeds and reduced loads on memory structures used to perform the comparison of string correlithm objects.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device can determine a degree of similarity that quantifies how similar different data samples are to one another.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

FIGS. 1-5 describe various embodiments of how a correlithm object processing system may be implemented or emulated in hardware, such as a special purpose computer. FIGS. 6-19 describe various embodiments of how a correlithm object processing system can generate and use string correlithm objects to record and faithfully playback data values.

Figure 1:
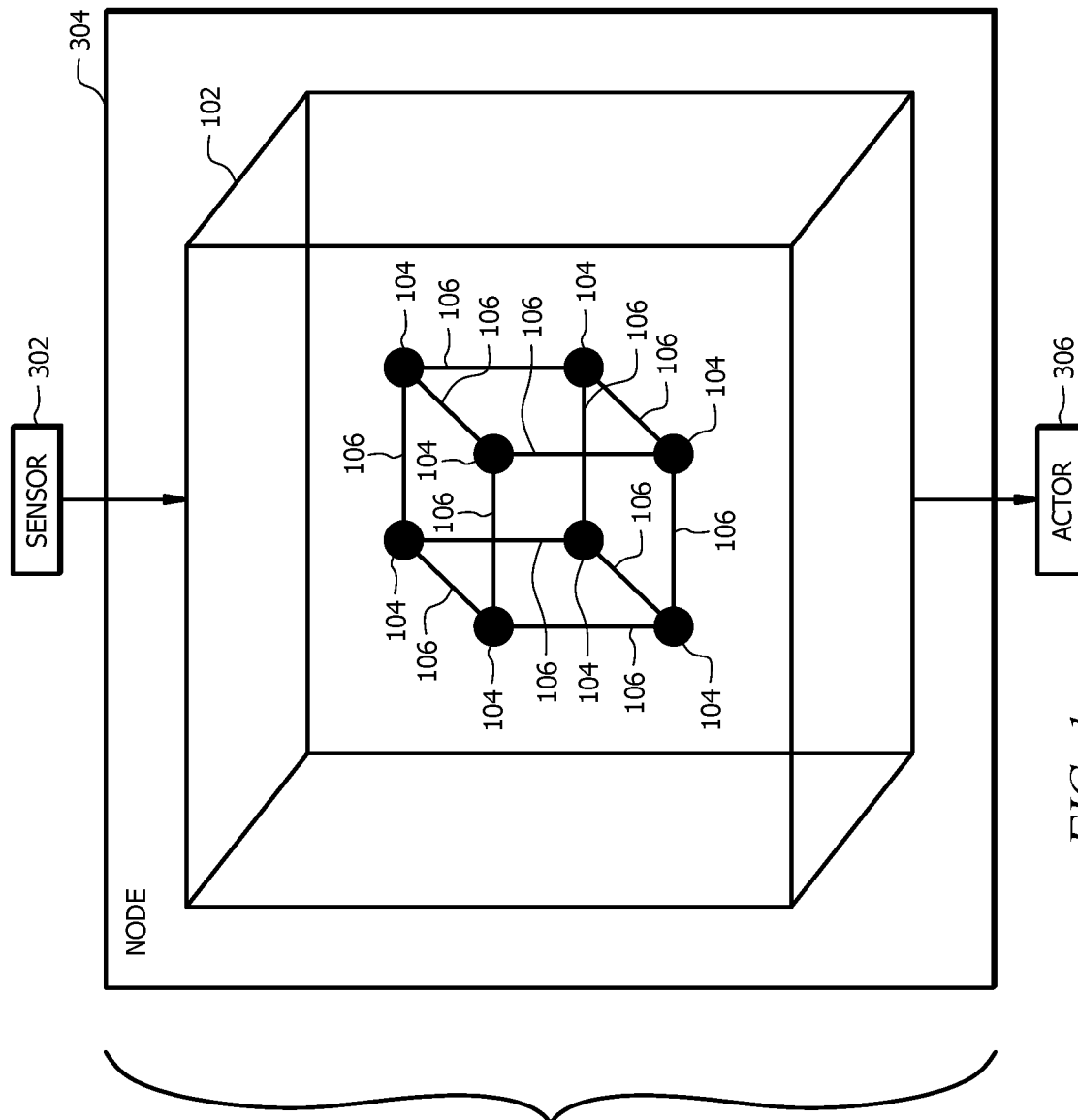
FIG. 1 is a schematic view of an embodiment of a special purpose computer implementing correlithm objects in an n-dimensional space.
Figure 1:
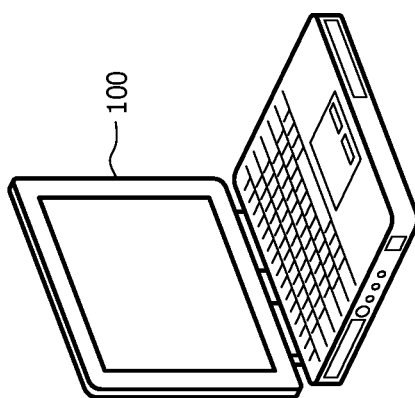

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each other is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engines are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using Hamming distance, anti-Hamming distance or any other suitable technique.

As an example using a 10-dimensional space 102, a first correlithm object 104 is represented by a first 10-bit string (1001011011) and a second correlithm object 104 is represented by a second 10-bit string (1000011011). The Hamming distance corresponds with the number of bits that differ between the first correlithm object 104 and the second correlithm object 104. Conversely, the anti-Hamming distance corresponds with the number of bits that are alike between the first correlithm object 104 and the second correlithm object 104. Thus, the Hamming distance between the first correlithm object 104 and the second correlithm object 104 can be computed as follows:

1001011011
1000011011
0001000000

In this example, the Hamming distance is equal to one because only one bit differs between the first correlithm object 104 and the second correlithm object. Conversely, the anti-Hamming distance is nine because nine bits are the same between the first and second correlithm objects 104. As another example, a third correlithm object 104 is represented by a third 10-bit string (0110100100). In this example, the Hamming distance between the first correlithm object 104 and the third correlithm object 104 can be computed as follows:

1001011011
0110100100
1111111111

The Hamming distance is equal to ten because all of the bits are different between the first correlithm object 104 and the third correlithm object 104. Conversely, the anti-Hamming distance is zero because none of the bits are the same between the first and third correlithm objects 104. In the previous example, a Hamming distance equal to one indicates that the first correlithm object 104 and the second correlithm object 104 are close to each other in the n-dimensional space 102, which means they are similar to each other. Similarly, an anti-Hamming distance equal to nine also indicates that the first and second correlithm objects are close to each other in n-dimensional space 102, which also means they are similar to each other. In the second example, a Hamming distance equal to ten indicates that the first correlithm object 104 and the third correlithm object 104 are further from each other in the n-dimensional space 102 and are less similar to each other than the first correlithm object 104 and the second correlithm object 104. Similarly, an anti-Hamming distance equal to zero also indicates that that the first and third correlithm objects 104 are further from each other in n-dimensional space 102 and are less similar to each other than the first and second correlithm objects 104. In other words, the similarity between a pair of correlithm objects can be readily determined based on the distance between the pair correlithm objects, as represented by either Hamming distances or anti-Hamming distances.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the Hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real-world values or representations and to correlithm objects 104 in a correlithm object domain. Sensors 302 are generally configured to convert real-world data samples to the correlithm object domain. Nodes 304 are generally configured to process or perform various operations on correlithm objects in the correlithm object domain. Actors 306 are generally configured to convert correlithm objects 104 into real-world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
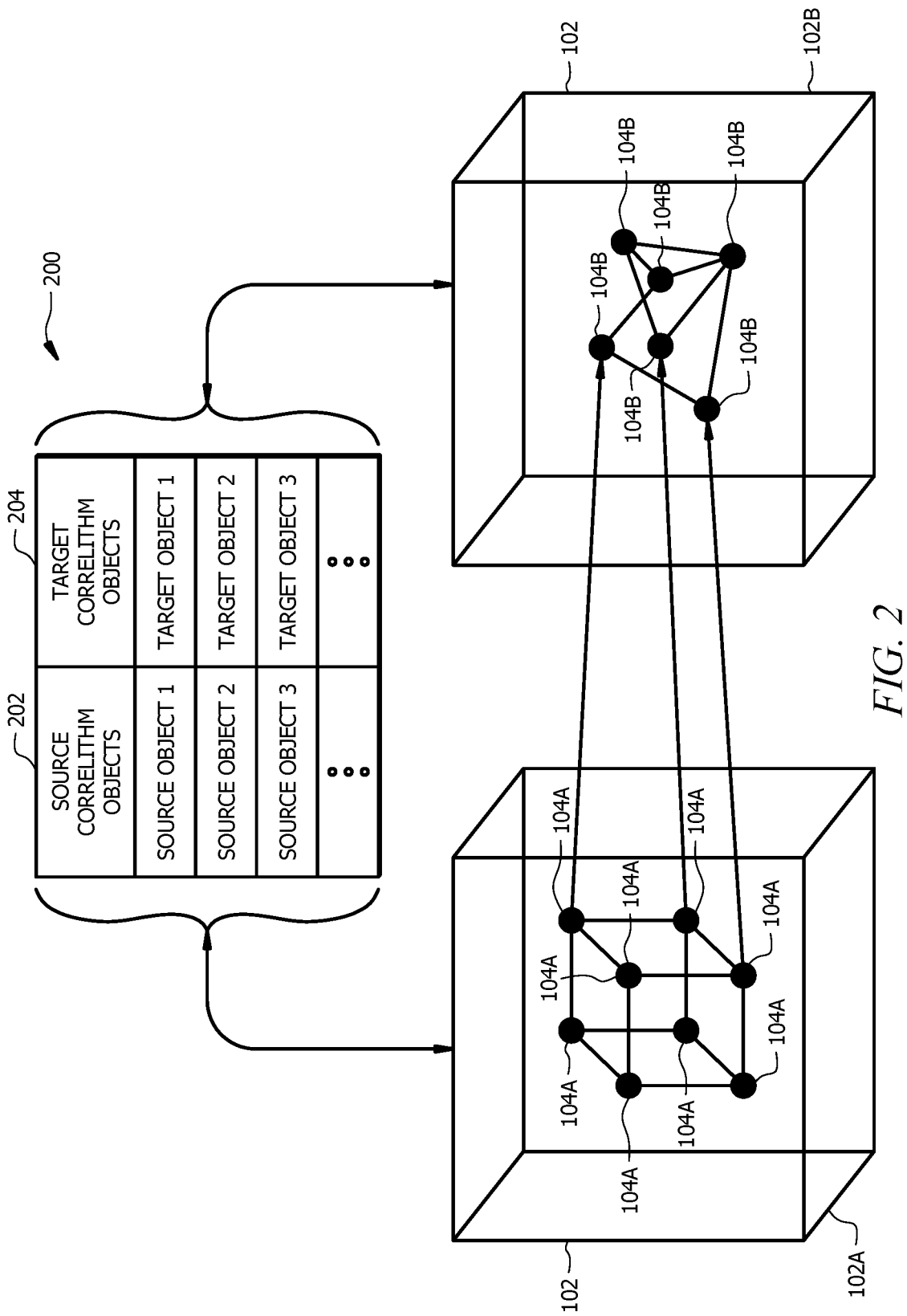
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real-world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number of dimensions or a different number of dimensions. For example, the first n-dimensional space 102A and the second n-dimensional space 102B may both be three dimensional spaces. As another example, the first n-dimensional space 102A may be a three-dimensional space and the second n-dimensional space 102B may be a nine-dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 104 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
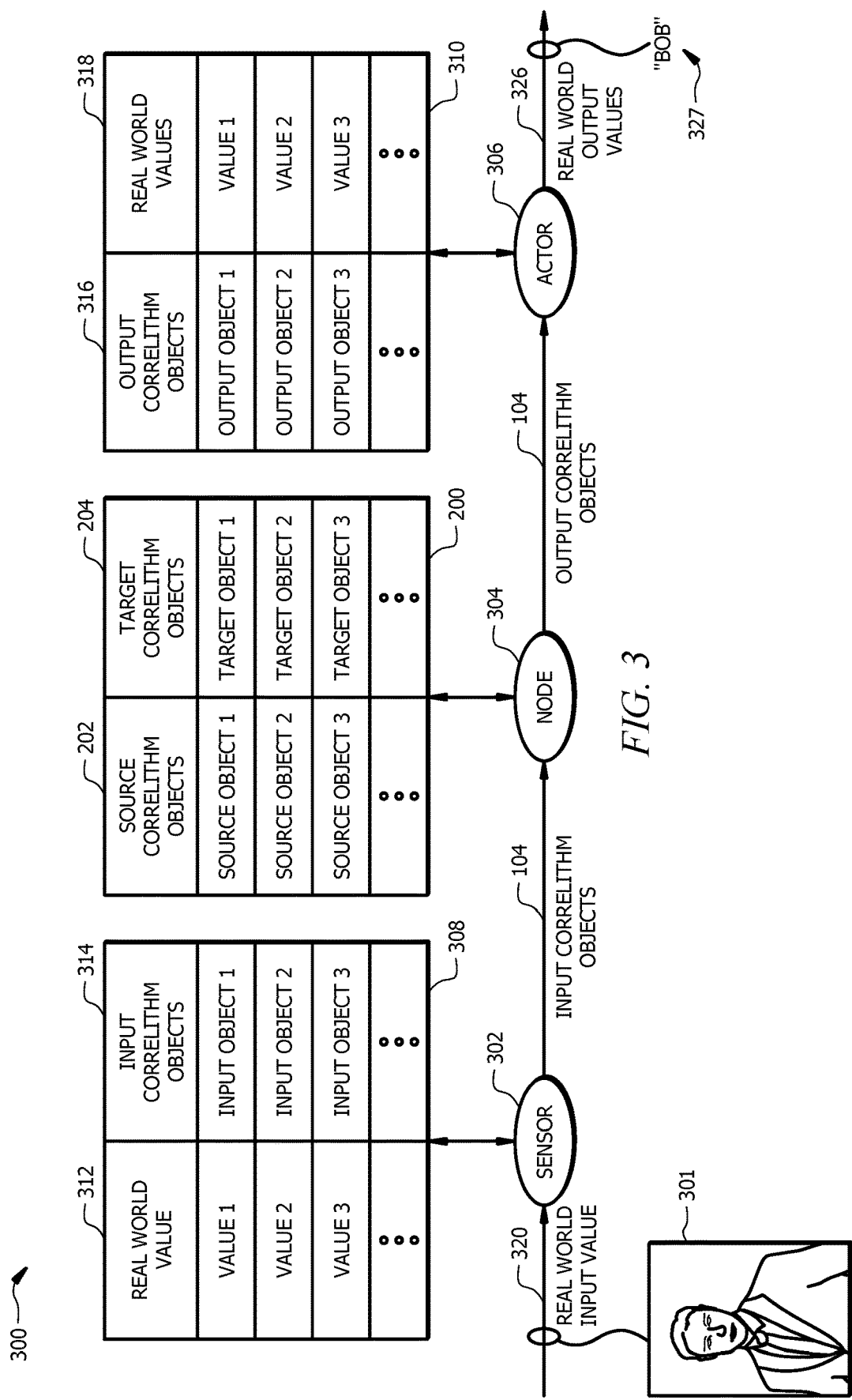
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real-world data samples into correlithm objects 104 that can be used in the correlithm object domain. Sensors 302 enable the user device 100 to compare and perform operations using correlithm objects 104 regardless of the data type or format of the original data sample. Sensors 302 are configured to receive a real-world value 320 representing a data sample as an input, to determine a correlithm object 104 based on the real-world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real-world values with a plurality of correlithm objects 104 in an n-dimensional space 102. Real-world values are any type of signal, value, or representation of data samples. Examples of real-world values include, but are not limited to, images, pixel values, text, audio signals, electrical signals, and biometric signals. As an example, a sensor table 308 may be configured with a first column 312 that lists real-world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real-world value 320 and a correlithm object 104 in an n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real-world values or data samples. Actors 306 enable the user device 100 to convert from correlithm objects 104 into any suitable type of real-world value. Actors 306 are configured to receive a correlithm object 104 (e.g. an output correlithm object 104), to determine a real-world output value 326 based on the received correlithm object 104, and to output the real-world output value 326. The real-world output value 326 may be a different data type or representation of the original data sample. As an example, the real-world input value 320 may be an image 301 of a person and the resulting real-world output value 326 may be text 327 and/or an audio signal identifying the person. In one embodiment, actors 306 are configured to use actor tables 310 that link a plurality of correlithm objects 104 in an n-dimensional space 102 with a plurality of real-world values. As an example, an actor table 310 may be configured with a first column 316 that lists correlithm objects 104 as output correlithm objects and a second column 318 that lists real-world values. In other examples, actor tables 310 may be configured in any other suitable manner or may be implemented using any other suitable data structure. In some embodiments, one or more mapping functions may be employed to translate between a correlithm object 104 in an n-dimensional space and a real-world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
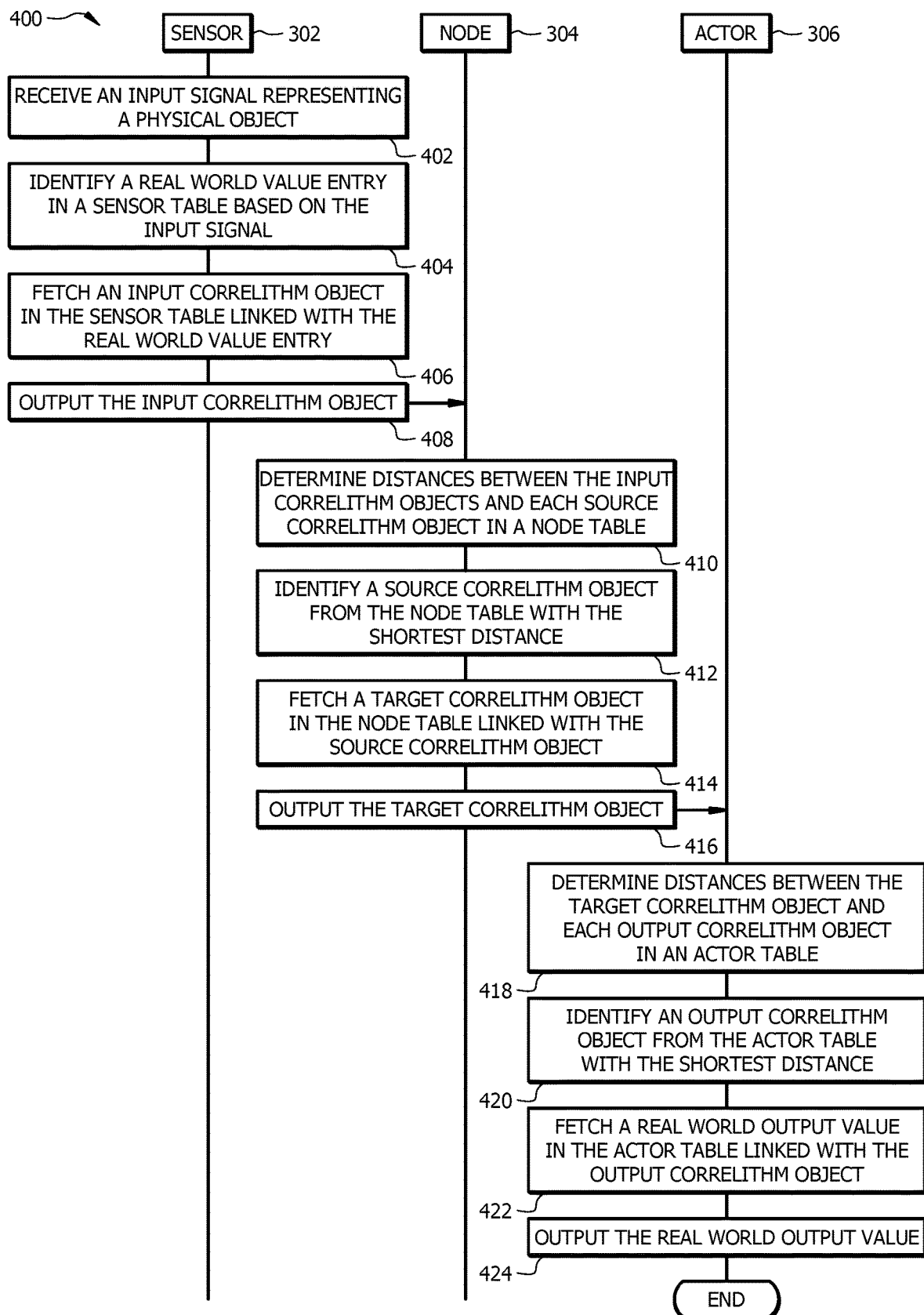
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real-world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real-world value entry in a sensor table 308 based on the input signal. In one embodiment, the system 300 identifies a real-world value entry in the sensor table 308 that matches the input signal. For example, the real-world value entries may comprise previously stored images. The sensor 302 may compare the received image to the previously stored images to identify a real-world value entry that matches the received image. In one embodiment, when the sensor 302 does not find an exact match, the sensor 302 finds a real-world value entry that closest matches the received image.

At step 406, the sensor 302 identifies and fetches an input correlithm object 104 in the sensor table 308 linked with the real-world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using Hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real-world output value in the actor table 310 linked with the output correlithm object 104. The real-world output value may be any suitable type of data sample that corresponds with the original input signal. For example, the real-world output value may be text that indicates the name of the person in the image or some other identifier associated with the person in the image. As another example, the real-world output value may be an audio signal or sample of the name of the person in the image. In other examples, the real-world output value may be any other suitable real-world signal or value that corresponds with the original input signal. The real-world output value may be in any suitable data type or format.

At step 424, the actor 306 outputs the identified real-world output value. In one embodiment, the actor 306 may output the real-world output value in real-time to a peripheral device (e.g. a display or a speaker). In one embodiment, the actor 306 may output the real-world output value to a memory or database. In one embodiment, the real-world output value is sent to another sensor 302. For example, the real-world output value may be sent to another sensor 302 as an input for another process.

Figure 5:
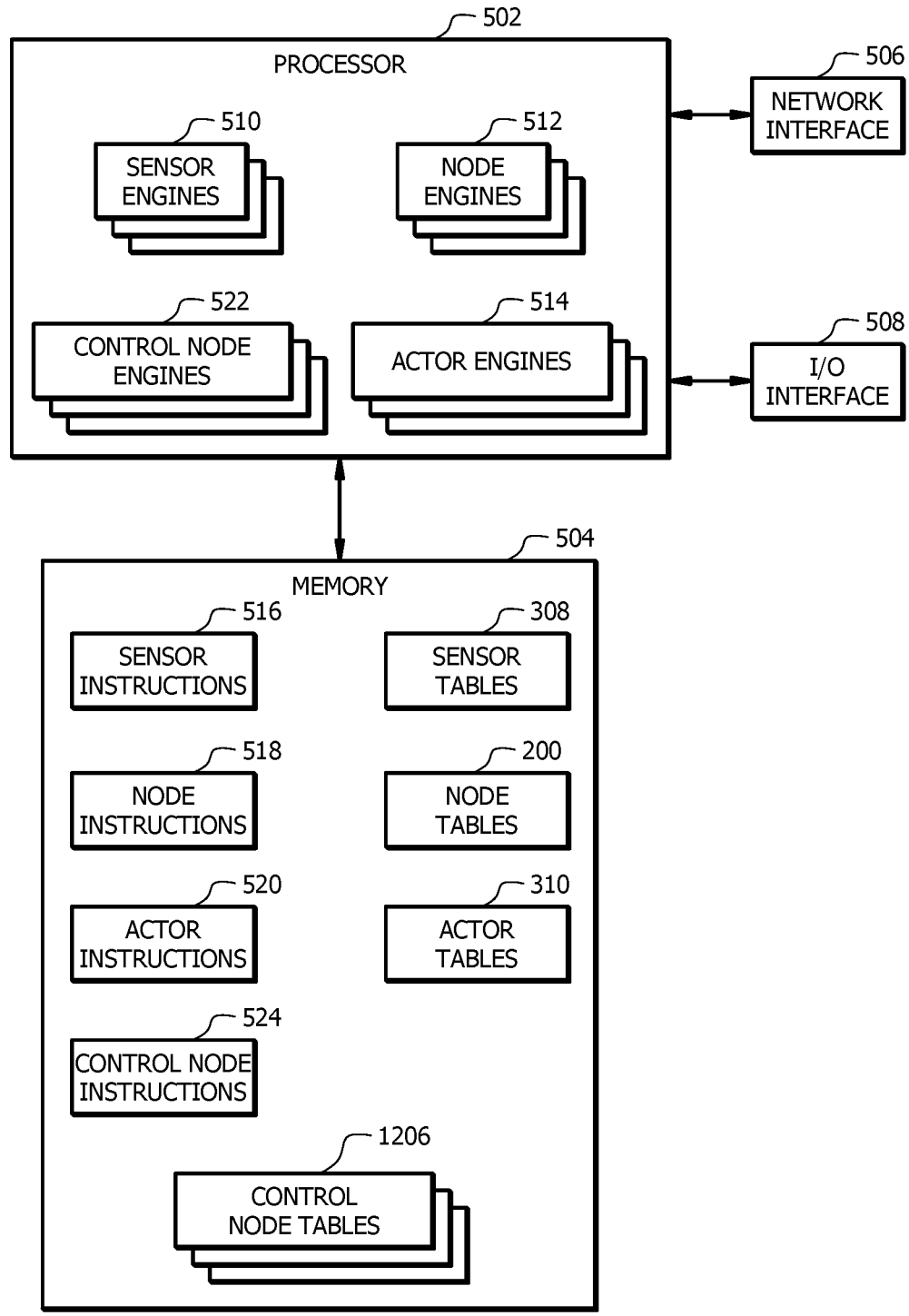
FIG. 5 is a schematic diagram of an embodiment a computer architecture for emulating a correlithm object processing system.

FIG. 5 is a schematic diagram of an embodiment of a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, actor engines 514, and control node engines 522. In an embodiment, the sensor engines 510, the node engines 512, the actor engines 514, and the control node engines 522 are implemented using logic units, FPGAs, ASICs, DSPs, or any other suitable hardware. The sensor engines 510, the node engines 512, the actor engines 514, and the control node engines 522 are each configured to implement a specific set of rules or processes that provides an improved technological result.

In one embodiment, the sensor engine 510 is configured to implement sensors 302 that receive a real-world value 320 as an input, determine a correlithm object 104 based on the real-world value 320, and output the correlithm object 104. An example operation of a sensor 302 implemented by a sensor engine 510 is described in FIG. 4. Sensor engine 510 is also configured to implement stimulus sensors 1204 that receive real-world values 1208 as an input, determine input stimulus correlithm objects 1210 based on the real-world values 1208, and output the input stimulus correlithm objects 1210. An example operation of stimulus sensors 1204 implemented by a sensor engine 510 is described in FIG. 12.

In one embodiment, the node engine 512 is configured to implement nodes 304 that receive a correlithm object 104 (e.g. an input correlithm object 104), determine another correlithm object 104 based on the received correlithm object 104, and output the identified correlithm object 104 (e.g. an output correlithm object 104). A node 304 implemented by a node engine 512 is also configured to compute distances between pairs of correlithm objects 104. An example operation of a node 304 implemented by a node engine 512 is described in FIG. 4. A particular operation of a node 304 that processes an input correlithm object 104 in conjunction with a stimulus condition, as implemented by a node engine 512, is described with respect to FIGS. 12 and 14.

In one embodiment, the actor engine 514 is configured to implement actors 306 that receive a correlithm object 104 (e.g. an output correlithm object 104), determine a real-world output value 326 based on the received correlithm object 104, and output the real-world output value 326. An example operation of an actor 306 implemented by an actor engine 514 is described in FIG. 4.

Figure 12:
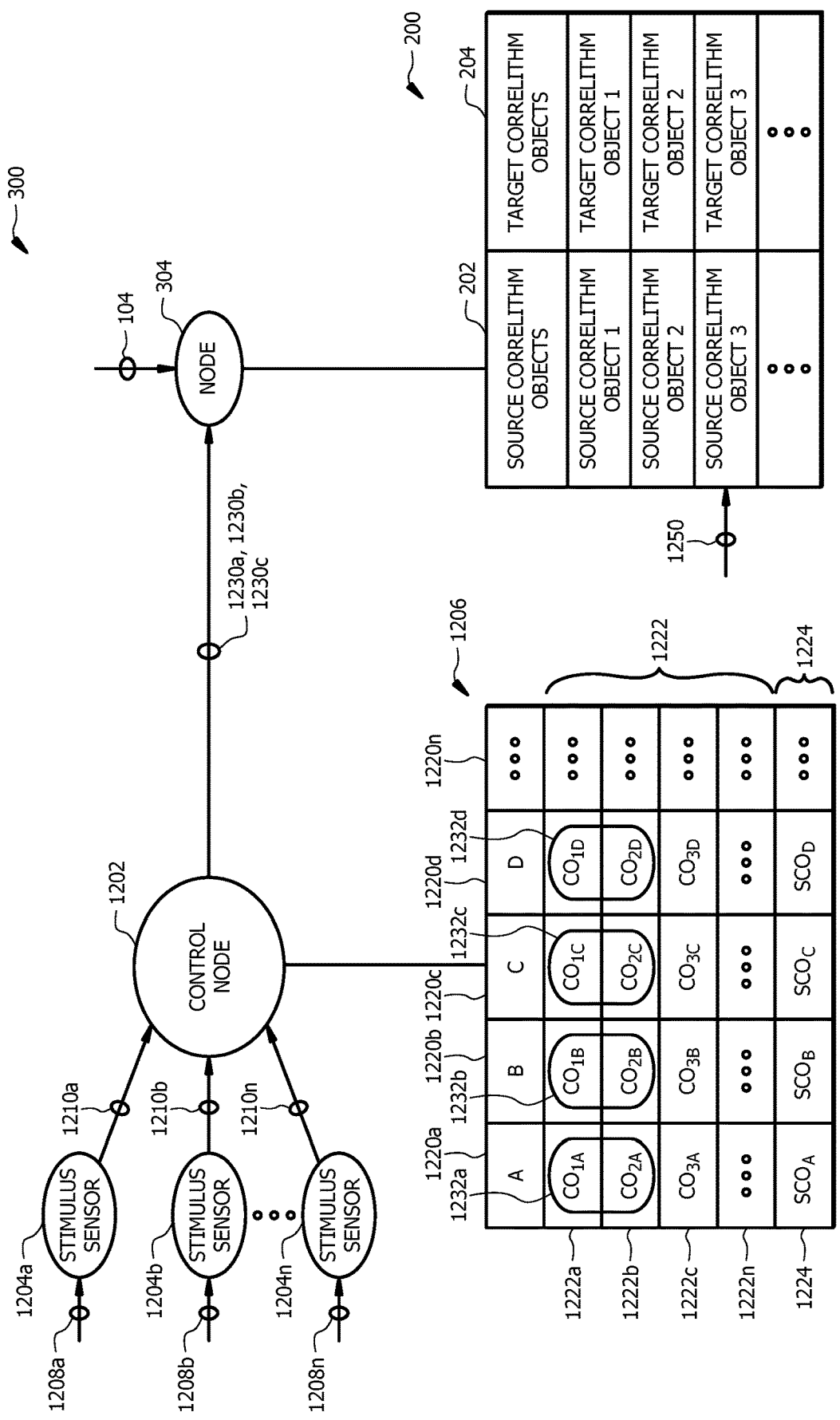
FIG. 12 is a schematic view of an embodiment of a correlithm object processing system.
Figure 13:
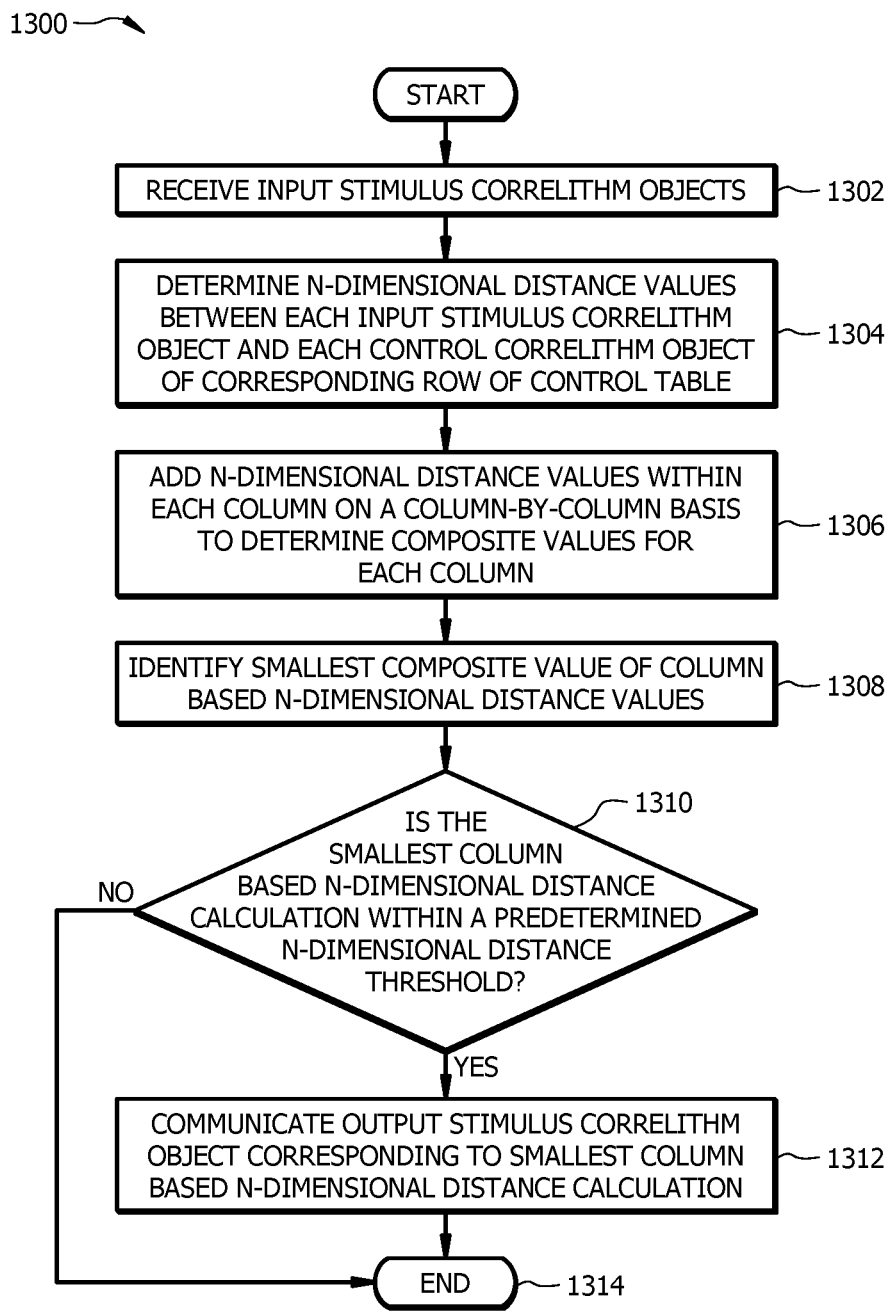
FIG. 13 is an embodiment of a process for emulating a control node in conjunction with stimulus conditions.

In one embodiment, a control node engine 522 is configured to implement a control node 1202, as described, for example, in FIGS. 12-13.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, control node instructions 524, sensor tables 308, node tables 200, actor tables 310, control node tables 1206, and/or any other data or instructions. The sensor instructions 516, the node instructions 518, the actor instructions 520, and the control node instructions 524 comprise any suitable set of instructions, logic, rules, or code operable to execute the sensor engines 510, node engines 512, the actor engines 514, and the control node engines 522, respectively.

The sensor tables 308, the node tables 200, and the actor tables 310 may be configured similar to the sensor tables 308, the node tables 200, and the actor tables 310 described in FIG. 3, respectively.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

Figure 6:
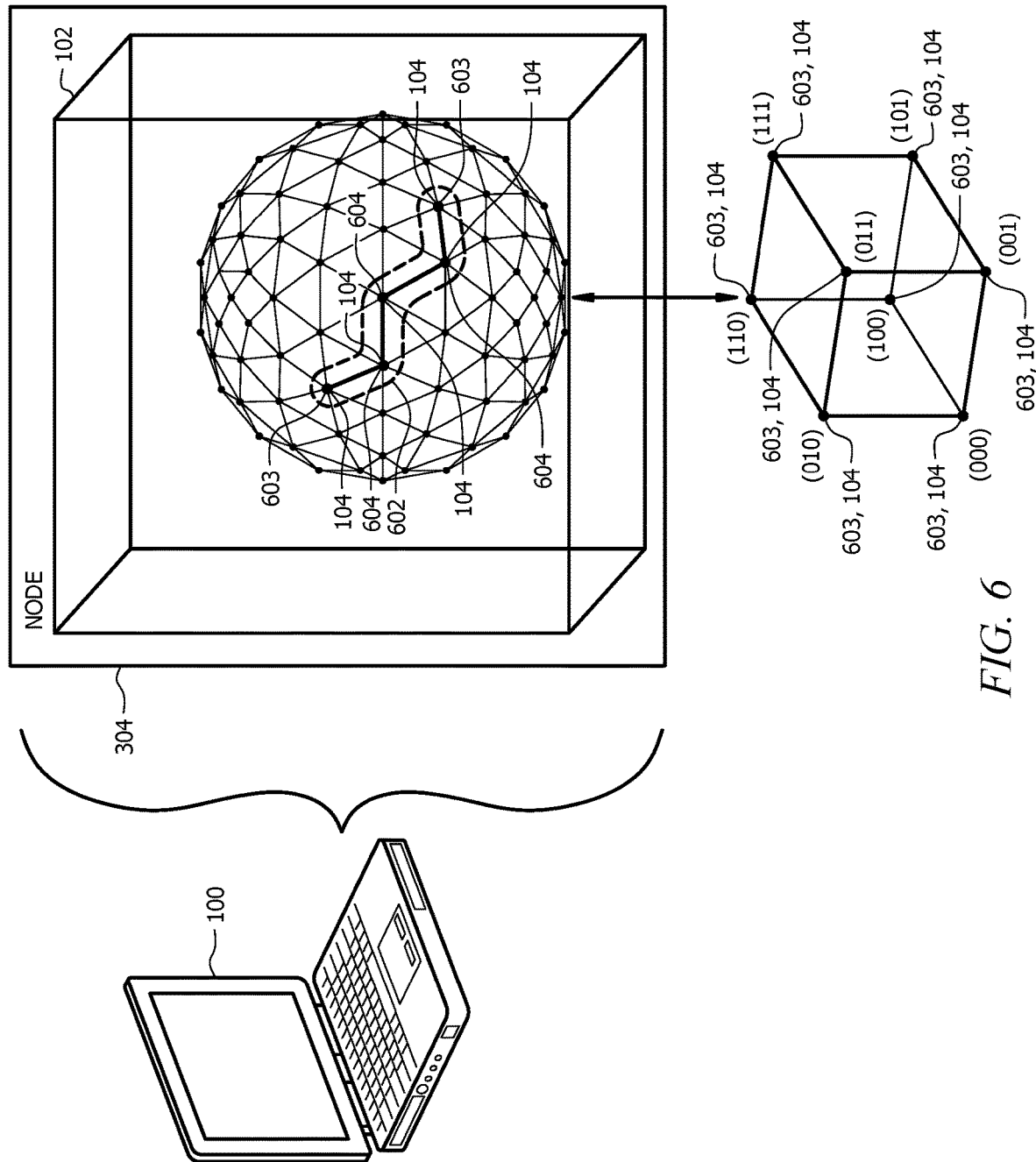
FIG. 6 illustrates an embodiment of how a string correlithm object may be implemented within a node by a device.
Figure 7:
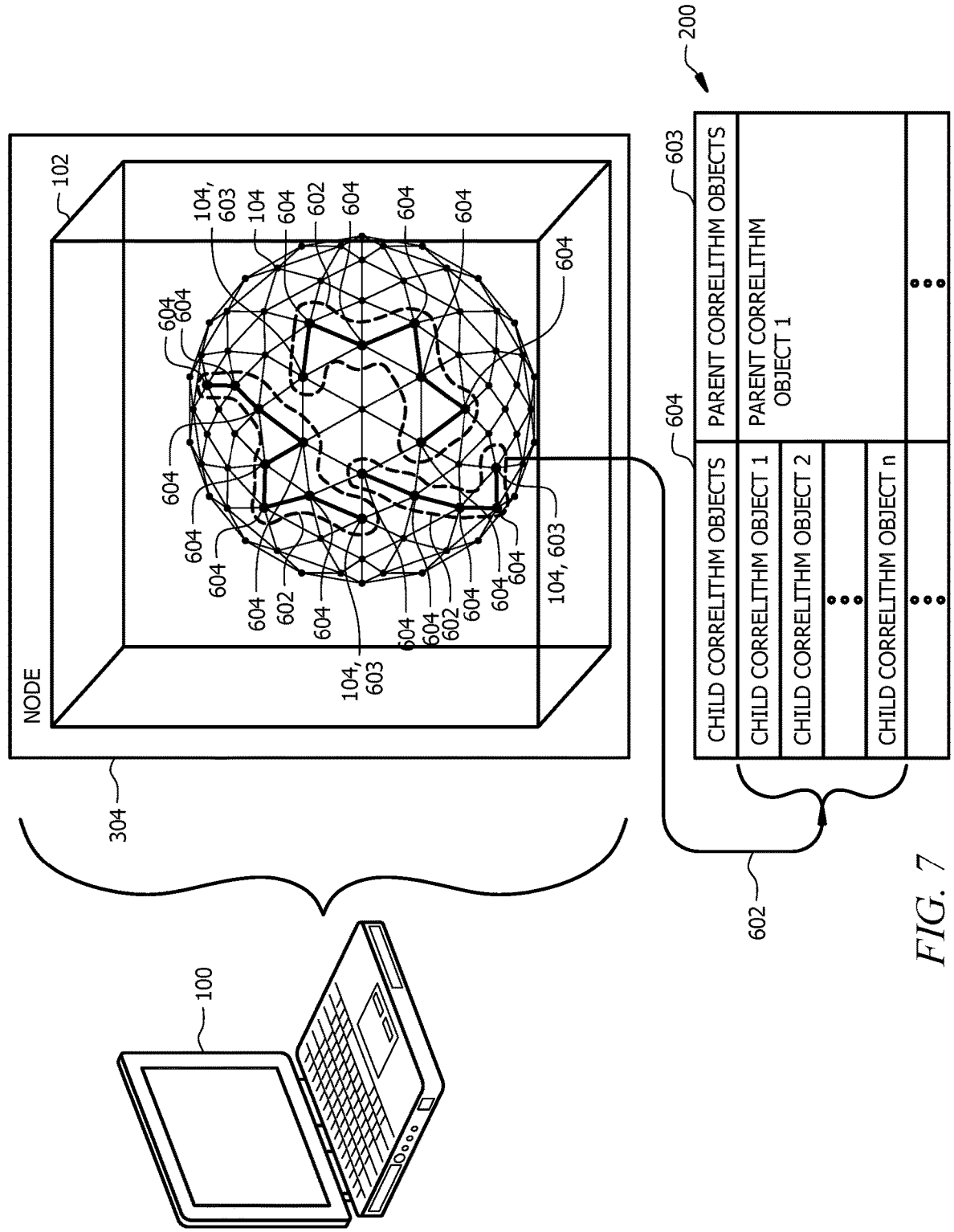
FIG. 7 illustrates another embodiment of how a string correlithm object may be implemented within a node by a device.

FIGS. 6 and 7 are schematic diagrams of an embodiment of a device 100 implementing string correlithm objects 602 for a correlithm object processing system 300. String correlithm objects 602 can be used by a correlithm object processing system 300 to embed higher orders of correlithm objects 104 within lower orders of correlithm objects 104. The order of a correlithm object 104 depends on the number of bits used to represent the correlithm object 104. The order of a correlithm object 104 also corresponds with the number of dimensions in the n-dimensional space 102 where the correlithm object 104 is located. For example, a correlithm object 104 represented by a 64-bit string is a higher order correlithm object 104 than a correlithm object 104 represented by 16-bit string.

Conventional computing systems rely on accurate data input and are unable to detect or correct for data input errors in real time. For example, a conventional computing device assumes a data stream is correct even when the data stream has bit errors. When a bit error occurs that leads to an unknown data value, the conventional computing device is unable to resolve the error without manual intervention. In contrast, string correlithm objects 602 enable a device 100 to perform operations such as error correction and interpolation within the correlithm object processing system 300. For example, higher order correlithm objects 104 can be used to associate an input correlithm object 104 with a lower order correlithm 104 when an input correlithm object does not correspond with a particular correlithm object 104 in an n-dimensional space 102. The correlithm object processing system 300 uses the embedded higher order correlithm objects 104 to define correlithm objects 104 between the lower order correlithm objects 104 which allows the device 100 to identify a correlithm object 104 in the lower order correlithm objects n-dimensional space 102 that corresponds with the input correlithm object 104. Using string correlithm objects 602, the correlithm object processing system 300 is able to interpolate and/or to compensate for errors (e.g. bit errors) which improve the functionality of the correlithm object processing system 300 and the operation of the device 100.

In some instances, string correlithm objects 602 may be used to represent a series of data samples or temporal data samples. For example, a string correlithm object 602 may be used to represent audio or video segments. In this example, media segments are represented by sequential correlithm objects that are linked together using a string correlithm object 602.

FIG. 6 illustrates an embodiment of how a string correlithm object 602 may be implemented within a node 304 by a device 100. In other embodiments, string correlithm objects 602 may be integrated within a sensor 302 or an actor 306. In 32-dimensional space 102 where correlithm objects 104 can be represented by a 32-bit string, the 32-bit string can be embedded and used to represent correlithm objects 104 in a lower order 3-dimensional space 102 which uses three bits. The 32-bit strings can be partitioned into three 12-bit portions, where each portion corresponds with one of the three bits in the 3-dimensional space 102. For example, the correlithm object 104 represented by the 3-bit binary value of 000 may be represented by a 32-bit binary string of zeros and the correlithm object represented by the binary value of 111 may be represented by a 32-bit string of all ones. As another example, the correlithm object 104 represented by the 3-bit binary value of 100 may be represented by a 32-bit binary string with 12 bits set to one followed by 24 bits set to zero. In other examples, string correlithm objects 602 can be used to embed any other combination and/or number of n-dimensional spaces 102.

In one embodiment, when a higher order n-dimensional space 102 is embedded in a lower order n-dimensional space 102, one or more correlithm objects 104 are present in both the lower order n-dimensional space 102 and the higher order n-dimensional space 102. Correlithm objects 104 that are present in both the lower order n-dimensional space 102 and the higher order n-dimensional space 102 may be referred to as parent correlithm objects 603. Correlithm objects 104 in the higher order n-dimensional space 102 may be referred to as child correlithm objects 604. In this example, the correlithm objects 104 in the 3-dimensional space 102 may be referred to as parent correlithm objects 603 while the correlithm objects 104 in the 32-dimensional space 102 may be referred to as child correlithm objects 604. In general, child correlithm objects 604 are represented by a higher order binary string than parent correlithm objects 603. In other words, the bit strings used to represent a child correlithm object 604 may have more bits than the bit strings used to represent a parent correlithm object 603. The distance between parent correlithm objects 603 may be referred to as a standard distance. The distance between child correlithm objects 604 and other child correlithm objects 604 or parent correlithm objects 603 may be referred to as a fractional distance which is less than the standard distance.

FIG. 7 illustrates another embodiment of how a string correlithm object 602 may be implemented within a node 304 by a device 100. In other embodiments, string correlithm objects 602 may be integrated within a sensor 302 or an actor 306. In FIG. 7, a set of correlithm objects 104 are shown within an n-dimensional space 102. In one embodiment, the correlithm objects 104 are equally spaced from adjacent correlithm objects 104. A string correlithm object 602 comprises a parent correlithm object 603 linked with one or more child correlithm objects 604. FIG. 7 illustrates three string correlithm objects 602 where each string correlithm object 602 comprises a parent correlithm object 603 linked with six child correlithm objects 603. In other examples, the n-dimensional space 102 may comprise any suitable number of correlithm objects 104 and/or string correlithm objects 602.

A parent correlithm object 603 may be a member of one or more string correlithm objects 602. For example, a parent correlithm object 603 may be linked with one or more sets of child correlithm objects 604 in a node table 200. In one embodiment, a child correlithm object 604 may only be linked with one parent correlithm object 603. String correlithm objects 602 may be configured to form a daisy chain or a linear chain of child correlithm objects 604. In one embodiment, string correlithm objects 602 are configured such that child correlithm objects 604 do not form loops where the chain of child correlithm objects 604 intersect with themselves. Each child correlithm objects 604 is less than the standard distance away from its parent correlithm object 603. The child correlithm objects 604 are equally spaced from other adjacent child correlithm objects 604.

In one embodiment, a data structure such as node table 200 may be used to map or link parent correlithm objects 603 with child correlithm objects 604. The node table 200 is generally configured to identify a plurality of parent correlithm objects 603 and one or more child correlithm objects 604 linked with each of the parent correlithm objects 603. For example, node table 200 may be configured with a first column that lists child correlithm objects 604 and a second column that lists parent correlithm objects 603. In other examples, the node table 200 may be configured in any other suitable manner or may be implemented using any other suitable data structure. In some embodiments, one or more mapping functions may be used to convert between a child correlithm object 604 and a parent correlithm object 603.

Figure 8:
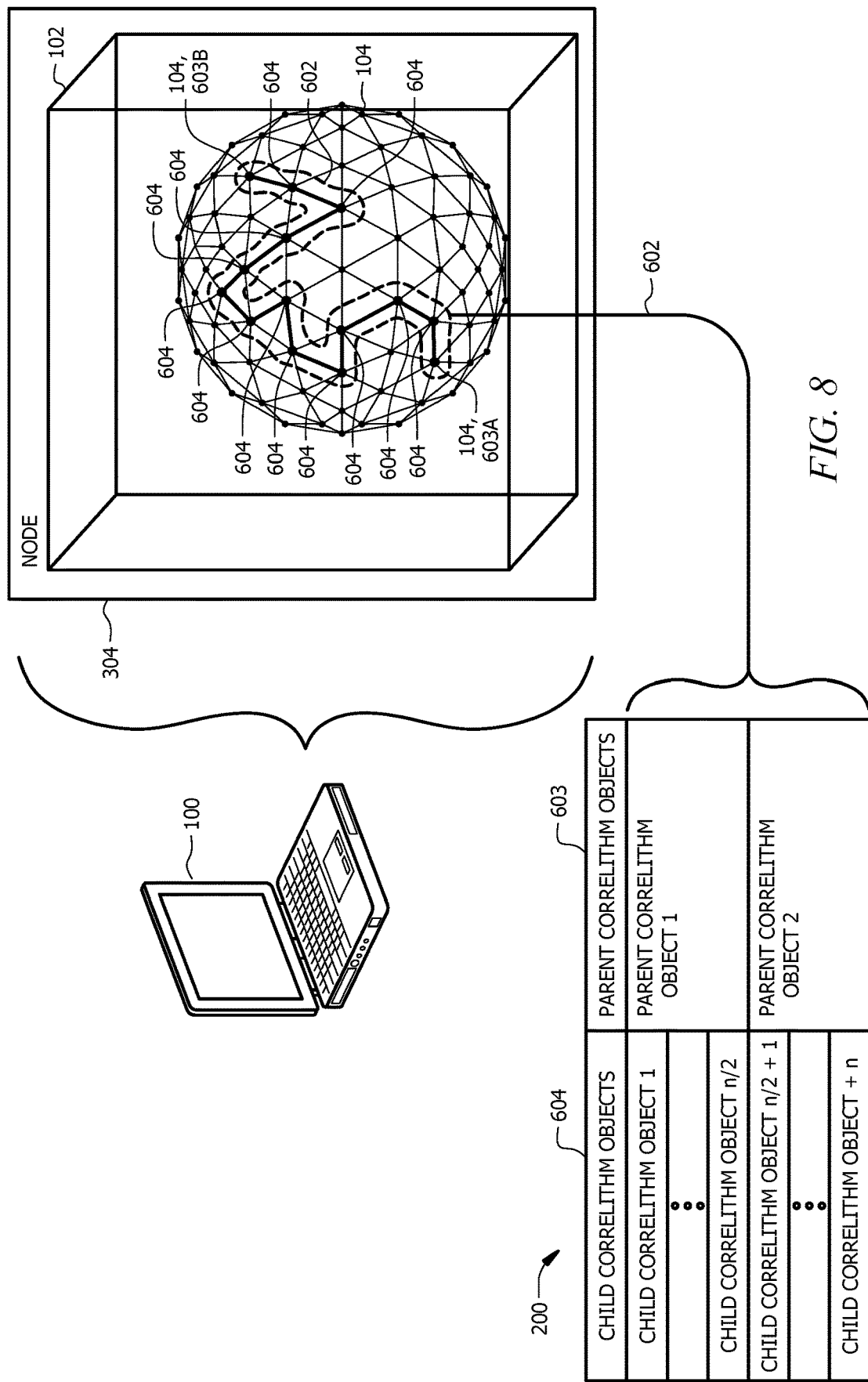
FIG. 8 is a schematic diagram of another embodiment of a device implementing string correlithm objects in a node for a correlithm object processing system.

FIG. 8 is a schematic diagram of another embodiment of a device 100 implementing string correlithm objects 602 in a node 304 for a correlithm object processing system 300. Previously in FIG. 7, a string correlithm object 602 comprised of child correlithm objects 604 that are adjacent to a parent correlithm object 603. In FIG. 8, string correlithm objects 602 comprise one or more child correlithm objects 604 in between a pair of parent correlithm objects 603. In this configuration, the string correlithm object 602 initially diverges from a first parent correlithm object 603A and then later converges toward a second parent correlithm object 603B. This configuration allows the correlithm object processing system 300 to generate a string correlithm object 602 between a particular pair of parent correlithm objects 603.

The string correlithm objects described in FIG. 8 allow the device 100 to interpolate value between a specific pair of correlithm objects 104 (i.e. parent correlithm objects 603). In other words, these types of string correlithm objects 602 allow the device 100 to perform interpolation between a set of parent correlithm objects 603. Interpolation between a set of parent correlithm objects 603 enables the device 100 to perform operations such as quantization which convert between different orders of correlithm objects 104.

In one embodiment, a data structure such as node table 200 may be used to map or link the parent correlithm objects 603 with their respective child correlithm objects 604. For example, node table 200 may be configured with a first column that lists child correlithm objects 604 and a second column that lists parent correlithm objects 603. In this example, a first portion of the child correlithm objects 604 is linked with the first parent correlithm object 603A and a second portion of the child correlithm objects 604 is linked with the second parent correlithm object 603B. In other examples, the node table 200 may be configured in any other suitable manner or may be implemented using any other suitable data structure. In some embodiments, one or more mapping functions may be used to convert between a child correlithm object 604 and a parent correlithm object 603.

Figure 9:
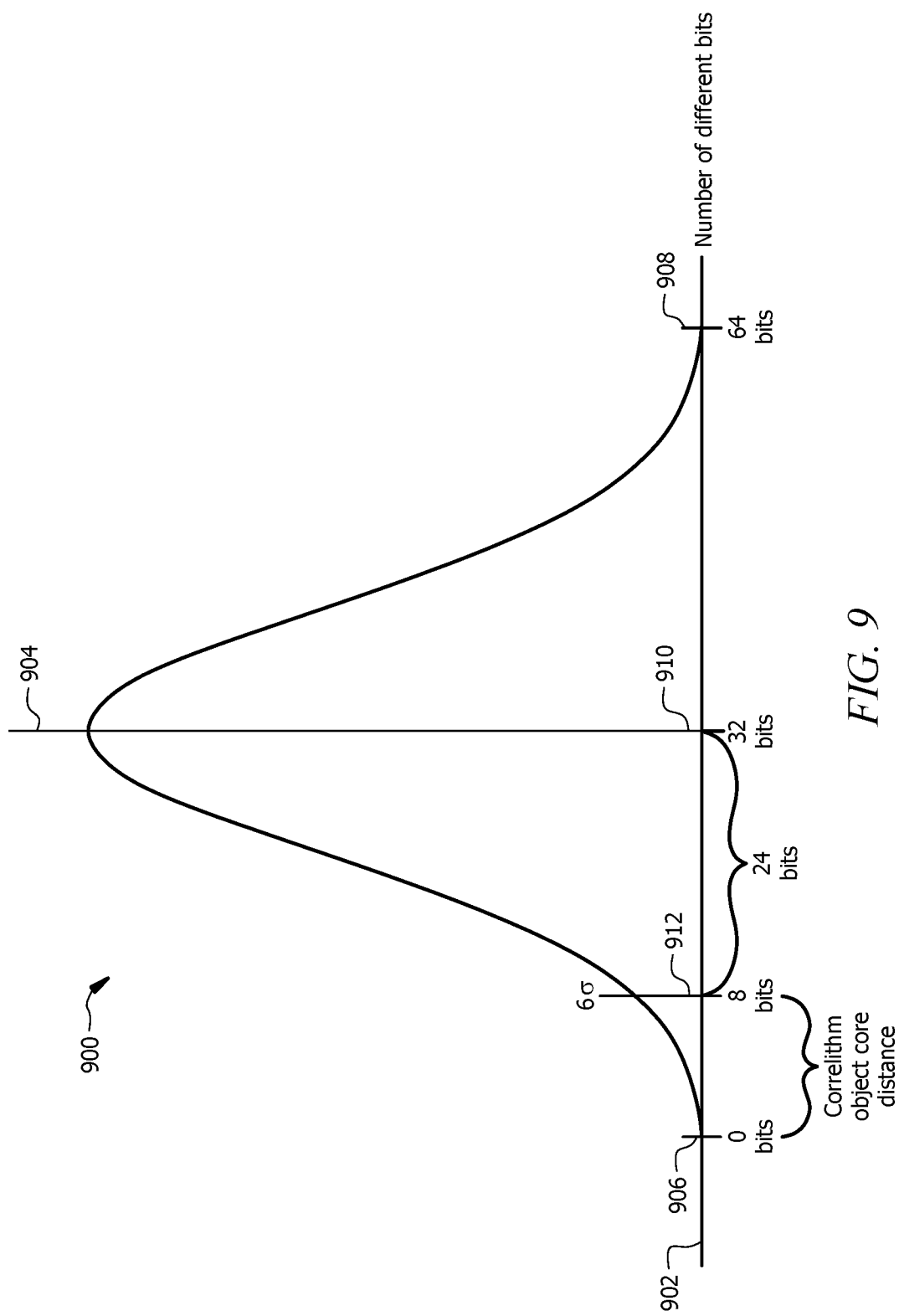
FIG. 9 is an embodiment of a graph of a probability distribution for matching a random correlithm object with a particular correlithm object.

FIG. 9 is an embodiment of a graph of a probability distribution 900 for matching a random correlithm object 104 with a particular correlithm object 104. Axis 902 indicates the number of bits that are different between a random correlithm object 104 with a particular correlithm object 104. Axis 904 indicates the probability associated with a particular number of bits being different between a random correlithm object 104 and a particular correlithm object 104.

As an example, FIG. 9 illustrates the probability distribution 900 for matching correlithm objects 104 in a 64-dimensional space 102. In one embodiment, the probability distribution 900 is approximately a Gaussian distribution. As the number of dimensions in the n-dimensional space 102 increases, the probability distribution 900 starts to shape more like an impulse response function. In other examples, the probability distribution 900 may follow any other suitable type of distribution.

Location 906 illustrates an exact match between a random correlithm object 104 with a particular correlithm object 104. As shown by the probability distribution 900, the probability of an exact match between a random correlithm object 104 with a particular correlithm object 104 is extremely low. In other words, when an exact match occurs the event is most likely deliberate and not a random occurrence.

Location 908 illustrates when all of the bits between the random correlithm object 104 with the particular correlithm object 104 are different. In this example, the random correlithm object 104 and the particular correlithm object 104 have 64 bits that are different from each other. As shown by the probability distribution 900, the probability of all the bits being different between the random correlithm object 104 and the particular correlithm object 104 is also extremely low.

Location 910 illustrates an average number of bits that are different between a random correlithm object 104 and the particular correlithm object 104. In general, the average number of different bits between the random correlithm object 104 and the particular correlithm object 104 is equal to $$\frac{n}{2}$$

(also referred to as standard distance), where 'n' is the number of dimensions in the n-dimensional space 102. In this example, the average number of bits that are different between a random correlithm object 104 and the particular correlithm object 104 is 32 bits.

Location 912 illustrates a cutoff region that defines a core distance for a correlithm object core. The correlithm object 104 at location 906 may also be referred to as a root correlithm object for a correlithm object core. The core distance defines the maximum number of bits that can be different between a correlithm object 104 and the root correlithm object to be considered within a correlithm object core for the root correlithm object. In other words, the core distance defines the maximum number of hops away a correlithm object 104 can be from a root correlithm object to be considered a part of the correlithm object core for the root correlithm object. Additional information about a correlithm object core is described in FIG. 10. In this example, the cutoff region defines a core distance equal to six standard deviations away from the average number of bits that are different between a random correlithm object 104 and the particular correlithm object 104. In general, the standard deviation is equal to $$\sqrt{\frac{n}{4}},$$

where 'n' is the number of dimensions in the n-dimensional space 102. In this example, the standard deviation of the 64-dimensional space 102 is equal to 4 bits. This means the cutoff region (location 912) is located 24 bits away from location 910 which is 8 bits away from the root correlithm object at location 906. In other words, the core distance is equal to 8 bits. This means that the cutoff region at location 912 indicates that the core distance for a correlithm object core includes correlithm objects 104 that have up to 8 bits different then the root correlithm object or are up to 8 hops away from the root correlithm object. In other examples, the cutoff region that defines the core distance may be equal any other suitable value. For instance, the cutoff region may be set to 2, 4, 8, 10, 12, or any other suitable number of standard deviations away from location 910.

Figure 10:
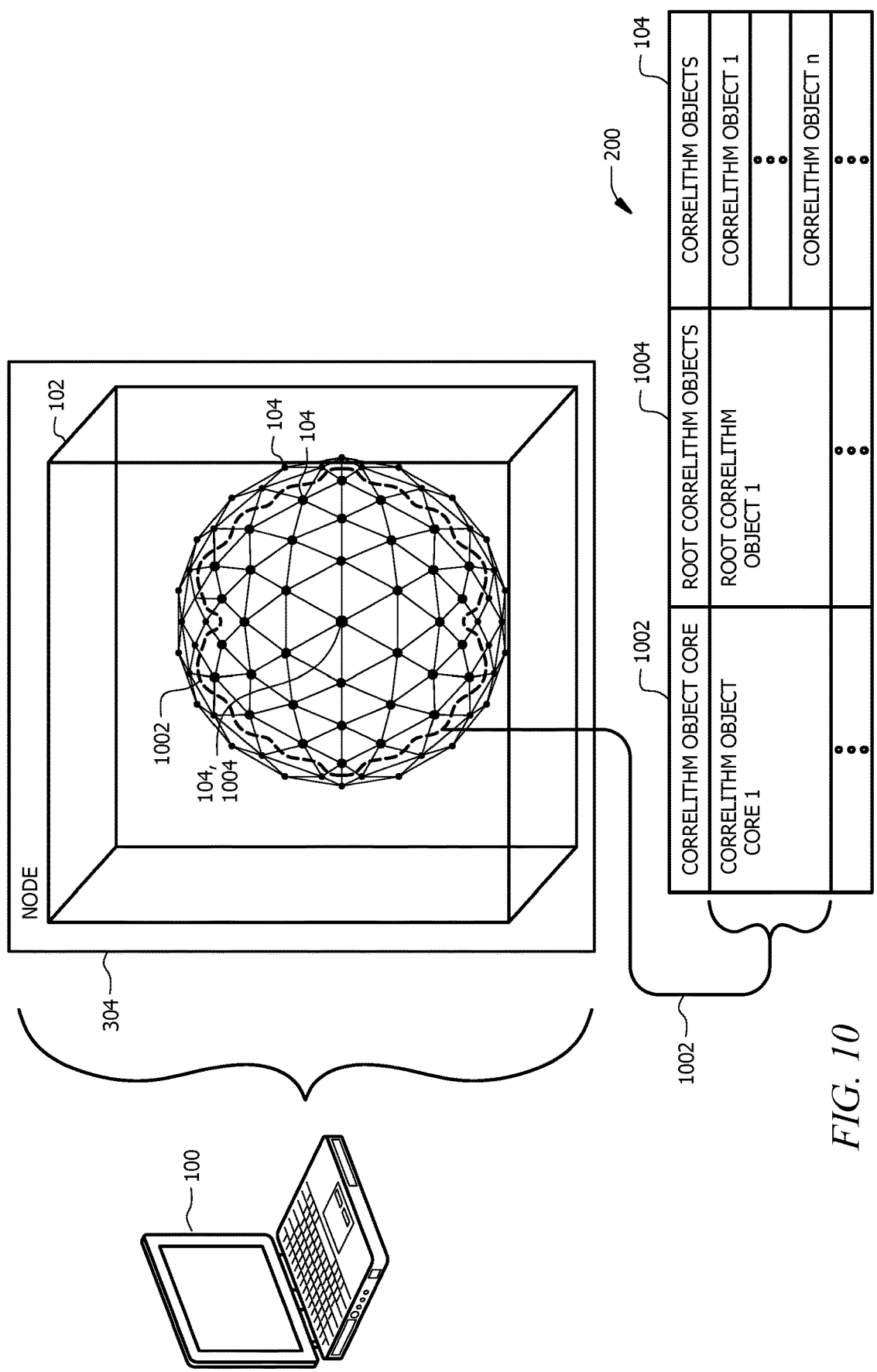
FIG. 10 is a schematic diagram of an embodiment of a device implementing a correlithm object core in a node for a correlithm object processing system.

FIG. 10 is a schematic diagram of an embodiment of a device 100 implementing a correlithm object core 1002 in a node 304 for a correlithm object processing system 300. In other embodiments, correlithm object cores 1002 may be integrated with a sensor 302 or an actor 306. Correlithm object cores 1002 can be used by a correlithm object processing system 300 to classify or group correlithm objects 104 and/or the data samples they represent. For example, a set of correlithm objects 104 can be grouped together by linking them with a correlithm object core 1402. The correlithm object core 1002 identifies the class or type associated with the set of correlithm objects 104.

In one embodiment, a correlithm object core 1002 comprises a root correlithm object 1004 that is linked with a set of correlithm objects 104. The set of correlithm objects 104 that are linked with the root correlithm object 1004 are the correlithm objects 104 which are located within the core distance of the root correlithm object 1004. The set of correlithm objects 104 are linked with only one root correlithm object 1004. The core distance can be computed using a process similar to the process described in FIG. 9. For example, in a 64-dimensional space 102 with a core distance defined at six sigma (i.e. six standard deviations), the core distance is equal to 8-bits. This means that correlithm objects 104 within up to eight hops away from the root correlithm object 1004 are members of the correlithm object core 1002 for the root correlithm object 1004.

In one embodiment, a data structure such as node table 200 may be used to map or link root correlithm objects 1004 with sets of correlithm objects 104. The node table 200 is generally configured to identify a plurality of root correlithm objects 1004 and correlithm objects 104 linked with the root correlithm objects 1004. For example, node table 200 may be configured with a first column that lists correlithm object cores 1002, a second column that lists root correlithm objects 1004, and a third column that lists correlithm objects 104. In other examples, the node table 200 may be configured in any other suitable manner or may be implemented using any other suitable data structure. In some embodiments, one or more mapping functions may be used to convert between correlithm objects 104 and a root correlithm object 1004.

Figure 11:
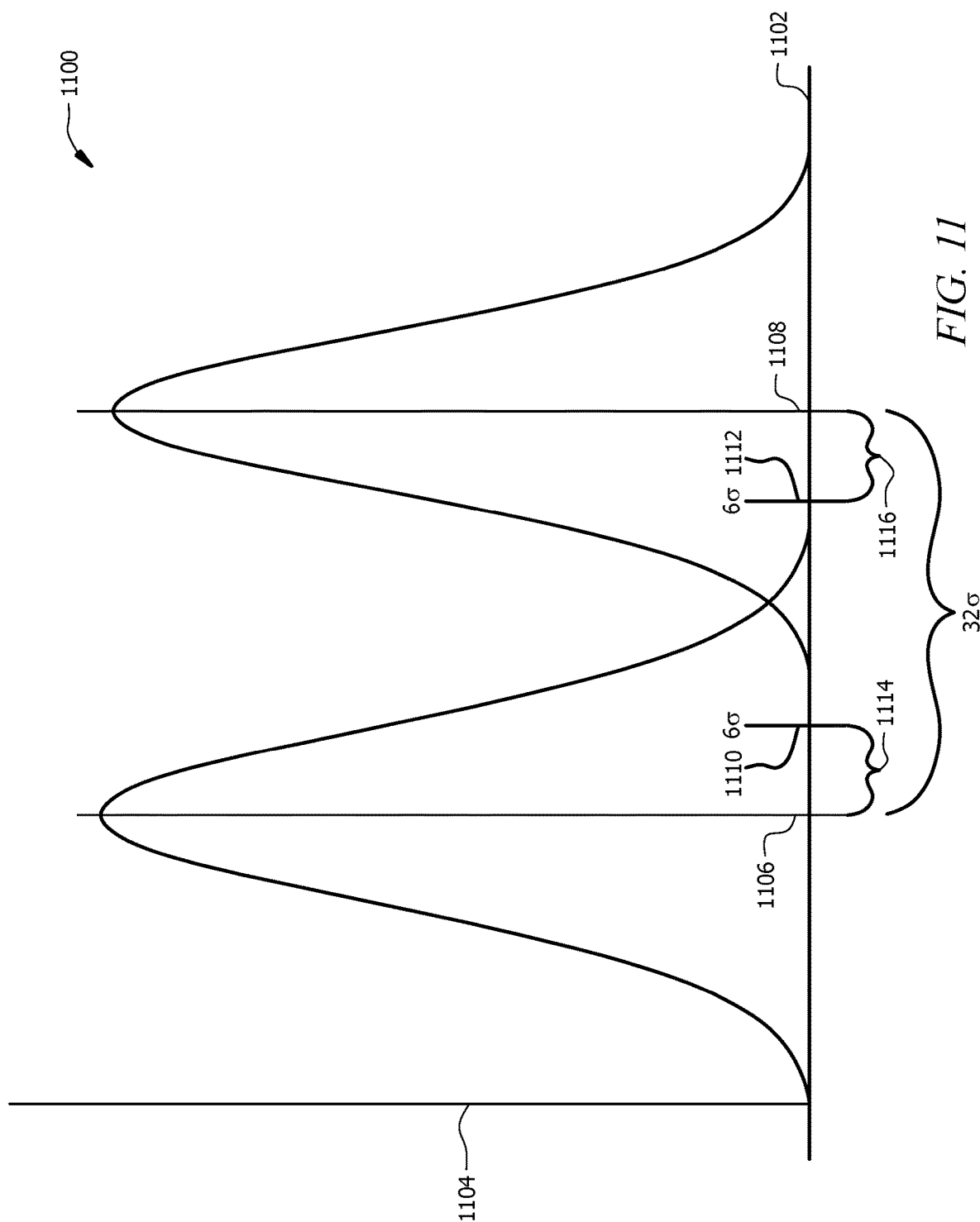
FIG. 11 is an embodiment of a graph of probability distributions for adjacent root correlithm objects.

FIG. 11 is an embodiment of a graph of probability distributions 1100 for adjacent root correlithm objects 1004. Axis 1102 indicates the distance between the root correlithm objects 1004, for example, in units of bits. Axis 1104 indicates the probability associated with the number of bits being different between a random correlithm object 104 and a root correlithm object 1004.

As an example, FIG. 11 illustrates the probability distributions for adjacent root correlithm objects 1004 in a 1024-dimensional space 102. Location 1106 illustrates the location of a first root correlithm object 1004 with respect to a second root correlithm object 1004. Location 1108 illustrates the location of the second root correlithm object 1004.

Each root correlithm object 1004 is located an average distance away from each other which is equal to $$\frac{n}{2},$$

where 'n' is the number of dimensions in the n-dimensional space 102. In this example, the first root correlithm object 1004 and the second root correlithm object 1004 are 512 bits or 32 standard deviations away from each other.

In this example, the cutoff region for each root correlithm object 1004 is located at six standard deviations from locations 1106 and 1108. In other examples, the cutoff region may be located at any other suitable location. For example, the cutoff region defining the core distance may one, two, four, ten, or any other suitable number of standard deviations away from the average distance between correlithm objects 104 in the n-dimensional space 102. Location 1110 illustrates a first cutoff region that defines a first core distance 1114 for the first root correlithm object 1004. Location 1112 illustrates a second cutoff region that defines a second core distance 1116 for the second root correlithm object 1004.

In this example, the core distances for the first root correlithm object 1004 and the second root correlithm object 1004 do not overlap with each other. This means that correlithm objects 104 within the correlithm object core 1002 of one of the root correlithm objects 1004 are uniquely associated with the root correlithm object 1004 and there is no ambiguity.

FIG. 12 illustrates a schematic view of an embodiment of correlithm object processing system 300 that is implemented by a user device 100 to perform operations using correlithm objects 104. The system 300 includes some or all of the components and functionality illustrated and described with respect to FIGS. 1-11, and includes additional components for enhanced functionality, as described in detail herein. System 300, including the additional components described herein, can be emulated using the computer architecture illustrated in FIG. 5. System 300 includes a control node 1202 coupled to a plurality of stimulus sensors 1204a, 1204b, and 1204n, and a control table 1206 that may be stored in memory 504. In general, stimulus sensors 1204 are configured to determine whether received real-world data is associated with either a positive stimulus, such as a desirability condition, or a negative stimulus, such as an undesirability condition, and generate an appropriate input stimulus correlithm object 1210 accordingly, which is communicated to control node 1202. Control node 1202 consults the contents of a control table 1206 to determine whether the indicated desirability or undesirability condition rises to the level of a stimulus that should be remembered and propagated throughout other portions of the system 300, such as to one or more nodes 304. If the stimulus determined by control node 1202 is sufficiently memorable, then node 304 may amend its node table 200 to include a new source correlithm object linked to a new target correlithm object associated with an input correlithm object 104 that was received in conjunction with the determined stimulus condition.

Stimulus sensors 1204a, 1204b, and 1204n are configured to receive real-world data and generate input stimulus correlithm objects 1210 associated therewith. For example, stimulus sensor 1204a receives real-world input value 1208a that may represent a desirability or undesirability condition. Stimulus sensor 1204a outputs a first input stimulus correlithm object 1210a comprising an n-bit digital word that represents the associated desirability or undesirability condition of the real world input value 1208a. In one embodiment, stimulus sensors 1204 operate similarly to sensors 302 in that stimulus sensors 1204 may access a sensor table 308 that links real-world data values 1208 to correlithm objects 104, such as input stimulus correlithm objects 1210. Stimulus sensors 1204 determine the appropriate input stimulus correlithm object 1210 to send to control node 1202 in conjunction with identifying which correlithm object 104 is linked to the received real-world data values 1208 in the sensor table 308. In a particular embodiment, the first input stimulus correlithm object 1210a also represents the degree of desirability or undesirability condition of the real-world input value 1208a (e.g., highly desirable, desirable, mildly desirable, neutral, mildly undesirable, undesirable, highly undesirable). Stimulus sensor 1204a communicates first input stimulus correlithm object 1210a to control node 1202. Similarly, stimulus sensors 1204b through 1204n are configured to receive real world input values 1208a through 1208n, respectively, and output input stimulus correlithm objects 1210b through 1210n, respectively, which represent varying degrees of desirability or undesirability conditions. Stimulus sensors 1204b through 1204n also communicate input stimulus correlithm objects 1210b through 1210n to control node 1202.

In a particular embodiment, the receipt of one or more of real world input data values 1208a through 1208n is in conjunction with the generation and propagation of a particular input correlithm object 104 elsewhere in system 300. And the generation of input stimulus correlithm objects 1210b through 1210n may indicate that the particular input correlithm object 104 is associated with a memorable event that should be remembered and considered for the future operation of system 300. In this way, system 300 may implement a form of active learning in an artificial intelligence system. For example, one practical application of detecting stimulus conditions associated with an input correlithm object 104 may be in conjunction with a network security application where an input correlithm object 104 may be associated with an intrusion attempt by a network device with a particular IP address. If the particular intrusion attempt is associated with one or more real-world input values 1208a through 1208n indicating an undesirable stimulus condition, such as malware being loaded on a computer or the exfiltration of data, then system 300 will want to remember the IP address of the network device associated with the undesirable intrusion attempt for possible future use in system 300. Another example of detecting stimulus conditions associated with an input correlithm object 104 may be in conjunction with the download of a particular network security patch. If the download of the particular network security patch is associated with one or more real-world input values 1208a through 1208n indicating a desirable stimulus condition, such as malware being prevented from loading on a computer or the thwarting of an attempt to exfiltrate data, then system 300 will want to remember the particular network security patch that was downloaded for possible future use in system 300. The techniques described herein facilitate active learning in these and other practical scenarios.

Control node 1202 uses a control table 1206 to determine the relevance and strength of potential desirable or undesirable stimulus conditions. Control table 1206 may be stored in memory 504 and incudes columns 1220a through 1220n, each column 1220 representing a particular stimulus condition. For example, column 1220a may represent a particular stimulus condition associated with malware being loaded on a computer and column 1220b may represent a particular stimulus condition associated with the exfiltration of data. Column 1220c may represent a particular stimulus condition associated with the prevention of malware from being loaded on a computer and column 1220d may represent a particular stimulus condition associated with thwarting an attempt to exfiltrate data. It should be understood that these are simply examples of desirable or undesirable stimulus conditions and that any number and combination of desirable and/or undesirable stimulus conditions may be represented by columns 1220 of control table 1206.

Control table 1206 further includes input rows 1222a through 1222n. Each input row 1222 is associated with a particular corresponding stimulus sensor 1204. For example, first input row 1222a is associated with first stimulus sensor 1204a, second input row 1222b is associated with second stimulus sensor 1204b, third input row 1222c is associated with third stimulus sensor 1204c, and so on. At the intersection of a particular row 1222 and a particular column 1220 is a cell that contains a particular control correlithm object. For example, first input row 1222a includes control correlithm objects $CO_{1A}$, $CO_{1B}$, $CO_{1C}$, $CO_{1D}$, and so on, corresponding to the stimulus conditions of columns 1220a through columns 1220n. Second input row 1222b includes control correlithm objects $CO_{2A}$, $CO_{2B}$, $CO_{2C}$, $CO_{2D}$, and so on, corresponding to the stimulus conditions of columns 1220a through columns 1220n. Third input row 1222c includes control correlithm objects $CO_{3A}$, $CO_{3B}$, $CO_{3C}$, $CO_{3D}$, and so on, corresponding to the stimulus conditions of columns 1220a through columns 1220n. Control table 1206 further includes an output row 1224 comprising output stimulus correlithm objects $SCO_A$, $SCO_B$, $SCO_C$, $SCO_D$, and so on, corresponding to the stimulus conditions of columns 1220a through 1220n.

While control table 1206 is described with respect to a particular organizational structure including columns 1220, rows 1222 and 1224, and control correlithm objects, it may be organized in any suitable manner to perform the stated operations and achieve the stated functionality described herein.

Control node 1202 processes one or more input stimulus correlithm objects 1210a through 1210n in conjunction with control table 1206. The operation of control node 1202 will be described with respect to different example input stimulus correlithm objects 1210 that may be received by control node 1202 in particular embodiments. In one embodiment, control node 1202 receives first input stimulus correlithm object 1210a and determines n-dimensional distances between first input stimulus correlithm object 1210a and each of the control correlithm objects $CO_{1A}$, $CO_{1B}$, $CO_{1C}$, $CO_{1D}$, and so on in the first input row 1222a of control table 1206. For example, control node 1202 may determine the Hamming distance, the anti-Hamming distance, the Minkowski distance, the Euclidean distance, or any other suitable measure of n-dimensional distances between first input stimulus correlithm object 1210a and each of the control correlithm objects in first input row 1222a of control table 1206. Control node 1202 identifies the control correlithm object in the first input row 1222a of control table 1206 that has the smallest n-dimensional distance to the first input stimulus correlithm object 1210a, and determines whether this n-dimensional distance is within a predetermined distance threshold to be statistically significant. For example, if the input stimulus correlithm objects 1210 and the control correlithm objects stored in node table 1206 are 256-bit digital words, then the standard distance between two random correlithm objects will be 128 bits and the standard deviation will be 8 bits. Accordingly, if a particular input stimulus correlithm object 1210 is within a predetermined number of standard deviations (e.g., six standard deviations) away from a corresponding control correlithm object stored in node table 1206, then it may be considered a statistically significant match in n-dimensional space 102. Although six standard deviations are used as an example for different embodiments described in FIG. 12, it should be understood that any suitable number of standard deviations may be used according to the specific parameters of a particular use case.

In this way, control node 1202 can determine whether the stimulus condition represented by input stimulus correlithm object 1210a correlates to any of the stimulus conditions represented by columns 1220a through 1220n of control table 1206. For example, if first input stimulus correlithm object 1210a represents a particular type of malware that is known to be affecting computer systems, then control node 1202 may determine that it correlates to the stimulus condition associated with column 1220a representing malware being loaded on a computer. Alternatively, if first input stimulus correlithm object 1210a represents an unsuccessful data exfiltration attempt, then control node 1202 may determine that it correlates to the stimulus condition associated with column 1220d representing thwarting an attempt to exfiltrate data.

If control node 1202 determines that the smallest n-dimensional distance between first input stimulus correlithm object 1210a and a particular control correlithm object stored in first input row 1222a of node table 1206 is within the predetermined number of standard deviations of n-dimensional space 102, then control node 1202 determines the column 1220 in which the identified control correlithm object resides. Control node 1202 then outputs an appropriate output stimulus correlithm object 1230a from output row 1224 of node table 1206 corresponding to the determined column 1220. Thus, if the determined control correlithm object is $CO_{1A}$ from column 1220a then control node 1202 outputs the output stimulus correlithm object 1230a that is $SCO_A$ from column 1220a. Alternatively, if the determined control correlithm object is $CO_{1D}$ from column 1220d then control node 1202 outputs the output stimulus correlithm object 1230d that is $SCO_D$ from column 1220d. The output stimulus correlithm object 1230a indicates to other components of system 300 that a statistically significant stimulus condition, either desirable or undesirable, occurred in system 300 and that a corresponding input correlithm object 104 that may be processed by other components of system 300, such as a node 304, is associated with this stimulus condition and should be remembered and recorded for future use. In a particular embodiment, the output stimulus correlithm object 1230a is embedded with information indicating the n-dimensional distance threshold of the determined control correlithm object.

Alternatively or in addition to receiving first input stimulus correlithm object 1210a, control node 1202 may receive any number and combination of other input stimulus correlithm objects 1210, such as second input stimulus correlithm object 1210b. In this embodiment, control node 1202 receives second input stimulus correlithm object 1210b and determines n-dimensional distances between second input stimulus correlithm object 1210b and each of the control correlithm objects $CO_{2A}$, $CO_{2B}$, $CO_{2C}$, $CO_{2D}$, and so on in the second input row 1222b of control table 1206. For example, control node 1202 may determine the Hamming distance, the anti-Hamming distance, the Minkowski distance, the Euclidean distance, or any other suitable measure of n-dimensional distances between second input stimulus correlithm object $1210b$ and each of the control correlithm objects in second input row $1222b$ of control table $1206$. Control node $1202$ identifies the control correlithm object in the second input row $1222b$ of control table $1206$ that has the smallest n-dimensional distance to the second input stimulus correlithm object $1210b$, and determines whether this n-dimensional distance is within a predetermined distance threshold (e.g., six standard deviations) to be statistically significant in n-dimensional space $102$.

In this way, control node $1202$ can determine whether the stimulus condition represented by second input stimulus correlithm object $1210b$ correlates to any of the stimulus conditions represented by columns $1220a$ through $1220n$ of control table $1206$. For example, if second input stimulus correlithm object $1210b$ represents the exfiltration of a particular type of sensitive data, then control node $1202$ may determine that it correlates to the stimulus condition associated with column $1220b$ representing the exfiltration of data. Alternatively, if second input stimulus correlithm object $1210b$ represents an unsuccessful attempt to download malware, then control node $1202$ may determine that it correlates to the stimulus condition associated with column $1220c$ representing preventing malware from being loaded on a computer.

If control node $1202$ determines that the smallest n-dimensional distance between second input stimulus correlithm object $1210b$ and a particular control correlithm object stored in second input row $1222b$ of node table $1206$ is within the predetermined number of standard deviations of n-dimensional space $102$, then control node $1202$ determines the column $1220$ in which the identified control correlithm object resides. Control node $1202$ then outputs an appropriate output stimulus correlithm object $1230b$ from output row $1224$ of node table $1206$ corresponding to the determined column $1220$. Thus, if the determined control correlithm object is $CO_{2B}$ from column $1220b$ then control node $1202$ outputs the output stimulus correlithm object $1230b$ that is $SCO_B$ from column $1220b$. Alternatively, if the determined control correlithm object is $CO_{2C}$ from column $1220c$ then control node $1202$ outputs the output stimulus correlithm object $1230c$ that is $SCO_C$ from column $1220c$. The output stimulus correlithm object $1230b$ indicates to other components of system $300$ that a statistically significant stimulus condition, either desirable or undesirable, occurred in system $300$ and that a corresponding input correlithm object $104$ that may be processed by other components of system $300$, such as a node $304$, is associated with this stimulus condition and should be remembered and recorded for future use. In a particular embodiment, the output stimulus correlithm object $1230b$ is embedded with information indicating the n-dimensional distance threshold of the determined control correlithm object.

In another embodiment, control node $1202$ receives multiple input stimulus correlithm objects $1210$ that are processed together in conjunction with control table $1206$ to determine an appropriate output stimulus correlithm object $1230c$. For example, control node $1202$ may receive first input stimulus correlithm object $1210a$ and second input stimulus correlithm object $1210b$. Control node $1202$ determines a first n-dimensional distance (e.g., Hamming distance, anti-Hamming distance, Minkowski distance, or Euclidean distance) between first input stimulus correlithm object $1210a$ and the control correlithm object in the first input row $1222a$ of control table $1206$ corresponding to first column $1220a$. This particular example will be explained with respect to determining the Hamming distance for ease of understanding. Control node $1202$ also determines a second n-dimensional distance (e.g., Hamming distance, anti-Hamming distance, Minkowski distance, or Euclidean distance) between second input stimulus correlithm object $1210b$ and the control correlithm object in the second input row $1222b$ of control table $1206$ corresponding to first column $1220a$. Control node $1202$ then adds the first Hamming distance calculation for first column $1220a$ with the second Hamming distance calculation for the first column $1220a$ to generate a first column Hamming distance composite value $1232a$. If other input stimulus correlithm objects $1210$ are received by control node $1202$ in conjunction with first input stimulus correlithm object $1210a$ and second input stimulus correlithm object $1210b$, then the Hamming distance between those correlithm objects $1210$ and corresponding control correlithm objects in the appropriate row $1222$ of control table $1206$ corresponding to the first column $1220a$ are also determined and added to the first column Hamming distance composite value $1232a$.

Control node $1202$ determines a third n-dimensional distance (e.g., Hamming distance, anti-Hamming distance, Minkowski distance, or Euclidean distance) between first input stimulus correlithm object $1210a$ and the control correlithm object in the first input row $1222a$ of control table $1206$ corresponding to second column $1220b$. Control node $1202$ also determines a fourth n-dimensional distance (e.g., Hamming distance, anti-Hamming distance, Minkowski distance, or Euclidean distance) between second input stimulus correlithm object $1210b$ and the control correlithm object in the second input row $1222b$ of control table $1206$ corresponding to second column $1220b$. Control node $1202$ then adds the third Hamming distance calculation for second column $1220b$ with the fourth Hamming distance calculation for the second column $1220b$ to generate a second column Hamming distance composite value $1232b$. If other input stimulus correlithm objects $1210$ are received by control node $1202$ in conjunction with first input stimulus correlithm object $1210a$ and second input stimulus correlithm object $1210b$, then the Hamming distance between those correlithm objects $1210$ and corresponding control correlithm objects in the appropriate row $1222$ of control table $1206$ corresponding to the second column $1220b$ are also determined and added to the second column Hamming distance composite value $1232b$.

Control node $1202$ repeats this process for the remaining columns $1220$ of control table $1206$ to determine corresponding column Hamming distance composite values $1232c$ through $1232n$. Control node $1202$ then determines which of the column Hamming distance composite values $1232a$ through $1232n$ is smallest, and further determines whether the smallest such column Hamming distance composite value $1232$ is within a predetermined n-dimensional distance threshold (e.g., six standard deviations). Control node $1202$ outputs an appropriate output stimulus correlithm object $1230c$ from output row $1224$ of node table $1206$ corresponding to the column $1220$ associated with the smallest column distance Hamming distance composite value $1232$ that is within the predetermined n-dimensional distance threshold. Thus, if the smallest column Hamming distance composite value $1232$ is associated with column $1220b$ then control node $1202$ outputs the output stimulus correlithm object $1230c$ that is $SCO_B$ from column $1220b$. Alternatively, if the smallest column Hamming distance composite value $1232$ is associated with column $1220a$ then control node $1202$ outputs the output stimulus correlithm object 1230 that is $SCO_A$ from column 1220*a*. The output stimulus correlithm object 1230*c* indicates to other components of system 300 that a statistically significant stimulus condition, either desirable or undesirable, occurred in system 300 and that a corresponding input correlithm object 104 that may be processed by other components of system 300, such as a node 304, is associated with this stimulus condition and should be remembered and recorded for future use. In a particular embodiment, the output stimulus correlithm object 1230*c* is embedded with information indicating the n-dimensional distance threshold of the column Hamming distance composite value 1232.

System 300 further includes a node 304 and node table 200 stored in memory 504. Node table 200 may be configured similar to table 200 described in FIGS. 2 and 3, and link source correlithm objects with target correlithm objects in n-dimensional space 102. Node 304 is configured to receive an input correlithm object 104 from any other component in system 300, such as a sensor 302 or another node 304. Node 304 may further receive one or more output stimulus correlithm objects 1230 in conjunction with receiving input correlithm object 104. The output stimulus correlithm objects 1230 may be communicated by control node 1202 previously described, and may also be referred to as a stimulus condition correlithm object 1230. Node 304 determines n-dimensional distances (e.g., Hamming distance, anti-Hamming distance, Minkowski distance, Euclidean distance, etc.) between the input correlithm object 104 and each of the source correlithm objects stored in column 202 of node table 200. If node 304 determines that input correlithm object 104 is not within an n-dimensional distance threshold (e.g., six standard deviations) from any of the source correlithm objects stored in column 202 of node table 200, then in response to also receiving stimulus condition correlithm object 1230 in conjunction with receiving input correlithm object 104, node 304 adds the input correlithm object 104 to the node table 200 as a new source correlithm object in column 202 of node table 200.

For example, assume that input correlithm object 104 and the source correlithm objects stored in node table 200 are 256-bit binary strings such that one standard deviation is 8 bits. If node 304 determines that the Hamming distances between input correlithm object 104 and either source correlithm object 1 or source correlithm object 2 stored in column 202 of node table 200 is not less than 48 (i.e., within six standard deviations), then node 304 determines that input correlithm object 104 is not statistically similar to either source correlithm object 1 or source correlithm object 2 in n-dimensional space 102. In this situation, in response to also receiving stimulus condition correlithm object 1230 in conjunction with receiving input correlithm object 104, node 304 adds the input correlithm object 104 to the node table 200 as source correlithm object 3 in column 202 of node table 200, as indicated by arrow 1250. Node 304 also links the new source correlithm object 3 in column 202 with a target correlithm object 3 in column 204 of node table 200. This pairing of new source correlithm object 3 and target correlithm object 3 in node table 200 is added to the node table 200 in recognition of the fact that input correlithm object 104 was received in conjunction with receiving a stimulus condition correlithm object 1230 from control node 1202, signifying either a desirable or undesirable condition that should be remembered and recorded in node table 200 for further use in system 300.

The stimulus condition correlithm object 1230 may represent an undesirability condition and the new target correlithm object 3 may be associated with the undesirability condition. For example, if the input correlithm object 104 was received by node 304 in conjunction with an undesirable condition, such as the successful download of malware on a computer in the system 300, then system 300 may want to store the input correlithm object 104 as a new source correlithm object 3 so that when new input correlithm objects 104 are received that match source correlithm object 3 in n-dimensional space 102, then system 300 can consider the possibility that malware is being downloaded on a computer in the system 300. Alternatively, the stimulus condition correlithm object 1230 may represent a desirability condition and the new target correlithm object 3 may be associated with the desirability condition. For example, if the input correlithm object 104 was received by node 304 in conjunction with a desirable condition, such as thwarting the download of malware on a computer in the system 300, then system 300 may want to store the input correlithm object 104 as a new source correlithm object 3 so that when new input correlithm objects 104 are received that match source correlithm object 3 in n-dimensional space 102, then system 300 can consider the possibility that it may help prevent malware from being downloaded on a computer in the system 300. In this way, system 300 is able to remember various memorable events that occur, which facilitates active learning in various artificial intelligence applications.

FIG. 13 illustrates one embodiment of a process 1300 for emulating a control node 1202 in a correlithm object processing system 300. At step 1302, control node 1202 receives one or more input stimulus correlithm objects 1210 from corresponding stimulus sensors 1204. The input stimulus correlithm objects 1210 generally provide an indication of a desirability condition or an undesirability condition. At step 1304, control node 1202 accesses a control table 1206 and determines n-dimensional distance values (e.g., Hamming distance, anti-Hamming distance, Minkowski distance, or Euclidean distance) between each input stimulus correlithm object 1210 received from particular stimulus sensors 1204 and each control correlithm object of a corresponding input row 1222 of the control table 1206. For example, control node 1202 determines the n-dimensional distance values between a first input stimulus correlithm object 1210*a* received from stimulus sensor 1204*a* and control correlithm objects $CO_{1A}, CO_{1B}, CO_{1C}, CO_{1D}$, and so on, in input row 1222*a* of control table 1206. If other input stimulus correlithm objects 1210 are received from other stimulus sensors 1204, then control node 1202 also determines the n-dimensional distance values between each of those input stimulus correlithm objects 1210 received from other stimulus sensors 1204 and the control correlithm objects in the input row 1222 corresponding to the particular stimulus sensor 1204 from which the particular stimulus correlithm object 1210 was received.

Execution proceeds to step 1306 where control node 1202 adds together the n-dimensional distance values determined at step 1304 on a column-by-column basis to determine composite values for each column 1220 of control table 1206. For example, control node 1202 may add together the Hamming distances between input stimulus correlithm objects 1210*a-n* and control correlithm objects $CO_{1A}, CO_{2A}, CO_{3A}, CO_{nA}$ of column 1220*a* in control table 1206 to generate a column Hamming distance composite value 1232*a*. Similarly, control node 1202 may add together the Hamming distances between input stimulus correlithm objects 1210*a-n* and control correlithm objects $CO_{1B}, CO_{2B}, CO_{3B}, CO_{nB}$ of column 1220*b* in control table 1206 to generate a column Hamming distance composite value 1232*b*. Control node 1202 may add together the Hamming distances on a column-by-column basis in this way to generate column Hamming distance composite values 1232 for the remainder of the control table 1206. At step 1308, control node 1202 identifies the smallest composite value 1232 of column-based n-dimensional distance values as determined at step 1306.

At step 1310, control node 1202 determines whether the smallest composite value 1232 identified at step 1308 is within a predetermined n-dimensional distance threshold (e.g., six standard deviations). If so, execution proceeds to step 1312 where control node 1202 communicates an output stimulus correlithm object 1230 from the column 1220 corresponding to the smallest composite value 1232 determined at step 1308. For example, if the composite value 1232a is the smallest value, then control node 1202 communicates $SCO_A$ as the output stimulus correlithm object 1230. Execution ends at step 1314. If at step 1310, the smallest composite value 1232 identified at step 1308 is not within a predetermined n-dimensional threshold, then execution proceeds to step 1314 where execution ends without communicating an output stimulus correlithm object 1230.

Figure 14:
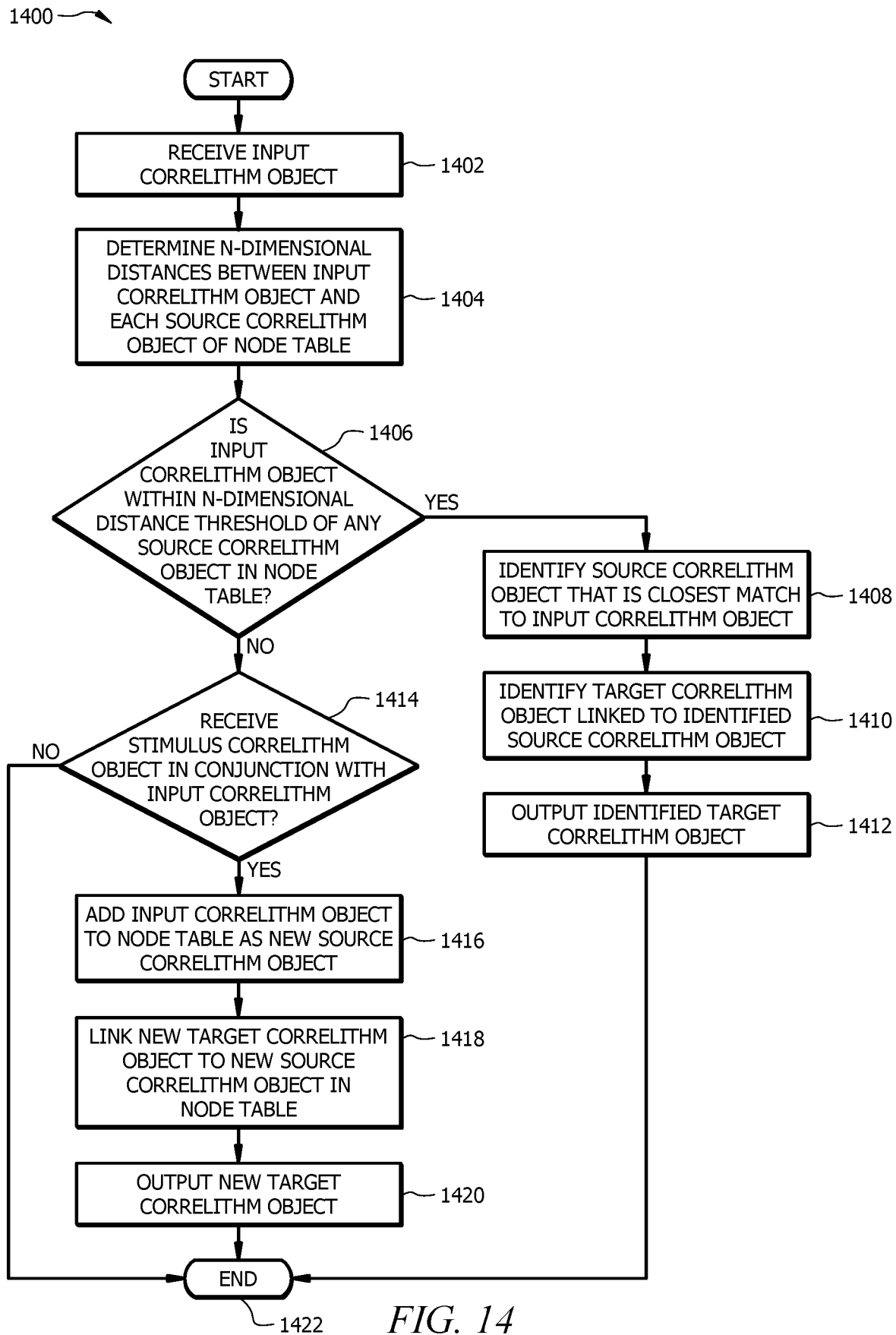
FIG. 14 is an embodiment of a process for emulating a node in conjunction with stimulus conditions.

FIG. 14 illustrates one embodiment of a process 1400 for emulating a node 304 in a correlithm object processing system 300. At step 1402, node 304 receives an input correlithm object 104. At step 1404, node 304 consults a node table 200 and determines n-dimensional distance values (e.g., Hamming distance, anti-Hamming distance, Minkowski distance, or Euclidean distance) between the input correlithm object 104 received at step 1402 with each source correlithm object of the node table 200. At step 1406, node 304 determines whether the input correlithm object 104 is within an n-dimensional distance threshold (e.g., six standard deviations) of any source correlithm object stored in the node table 200. If so, execution proceeds to step 1408 where node 304 identifies the source correlithm object from the node table 200 that is the closest match (e.g., smallest n-dimensional distance) to the input correlithm object 104. Execution proceeds to step 1410, where node 304 identifies the target correlithm object linked to the source correlithm object identified at step 1408. At step 1412, node 304 outputs the target correlithm object identified at step 1410.

If at step 1406, node 304 determines that the input correlithm object 104 is not within a suitable n-dimensional distance threshold of any source correlithm object stored in node table 200, then execution proceeds to step 1414 where node 304 determines whether it received a stimulus correlithm object 1230 in conjunction with receiving the input correlithm object 104. For example, node 304 may receive an output stimulus correlithm object 1230 communicated by control node 1202 at step 1312 of the process 1300 illustrated in FIG. 13. If so, execution proceeds to step 1416 where node 304 adds the input correlithm object 104 received at step 1402 to the node table 200 as a new source correlithm object, and at step 1418 node 304 links a new target correlithm object to the newly added source correlithm object in the node table 200. Node 304 outputs the new target correlithm object at step 1420. Execution terminates at step 1422. If at step 1414, it is determined that a stimulus correlithm object 1230 was not received in conjunction with the input correlithm object 104 received at step 1402, then execution proceeds to step 1420 where the process terminates without adding the input correlithm object 104 to the node table 200 as a new source correlithm object.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device configured to emulate a correlithm object processing system, comprising:
a first stimulus sensor implemented by a processor and configured to output a first input stimulus correlithm object comprising an n-bit digital word;
a memory operable to store a control table that comprises:
a first column corresponding to a first stimulus condition;
a second column corresponding to a second stimulus condition;
a first input row corresponding to the first stimulus sensor and comprising a first control correlithm object corresponding to the first column and a second control correlithm object corresponding to the second column;
an output row comprising a first output stimulus correlithm object corresponding to the first column and a second output stimulus correlithm object corresponding to the second column;
a control node communicatively coupled to the first stimulus sensor and the memory, the control node implemented by the processor and configured to:
receive the first input stimulus correlithm object;
determine n-dimensional distances between the first input stimulus correlithm object and each of the control correlithm objects in the first input row of the control table;
identify a particular control correlithm object in the first input row of the control table that has a smallest n-dimensional distance to the first input stimulus correlithm object;
determine that the smallest n-dimensional distance is within a predetermined n-dimensional distance threshold;
determine a particular column in which the identified correlithm object resides; and
output an output stimulus correlithm object corresponding to the determined column.

2. The device of claim 1, wherein the determined n-dimensional distances comprise Hamming distances.

3. The device of claim 1, wherein the n-dimensional distance threshold comprises a predetermined number of standard deviations of n-dimensional distance.

4. The device of claim 1, further comprising a second stimulus sensor implemented by a processor and configured to output a second input stimulus correlithm object comprising an n-bit digital word, and wherein:
the control table further comprises a second input row corresponding to the second stimulus sensor and comprising a third correlithm object corresponding to the first column and a fourth correlithm object corresponding to the second column;
the output stimulus correlithm object comprises a first output stimulus correlithm object;
the control node is further configured to:
receive the second input stimulus correlithm object;
determine n-dimensional distances between the second input stimulus correlithm object and each of the control correlithm objects in the second input row of the control table;
identify the control correlithm object in the second input row of the control table that has the smallest n-dimensional distance to the second input stimulus correlithm object;
determine that the smallest n-dimensional distance is within the predetermined n-dimensional distance threshold;
determine the column in which the identified control correlithm object resides; and
output a second output stimulus correlithm object corresponding to the determined column.

5. The device of claim 1, wherein the output stimulus correlithm object represents a desirability condition.

6. The device of claim 1, wherein the output stimulus correlithm object represents an undesirability condition.

7. The device of claim 1, wherein the first stimulus sensor is configured to:
receive real world data;
access a sensor table that links real world data with input stimulus correlithm objects; and
determine the first input stimulus correlithm object in conjunction with accessing the sensor table using the received real world data.

8. A method for emulating a node in a correlithm object processing system, comprising:
outputting a first input stimulus correlithm object comprising an n-bit digital word;
storing a control table that comprises:
a first column corresponding to a first stimulus condition;
a second column corresponding to a second stimulus condition;
a first input row corresponding to a source of the first input stimulus correlithm object and comprising a first control correlithm object corresponding to the first column and a second control correlithm object corresponding to the second column;
an output row comprising a first output stimulus correlithm object corresponding to the first column and a second output stimulus correlithm object corresponding to the second column;
receiving the first input stimulus correlithm object;
determining n-dimensional distances between the first input stimulus correlithm object and each of the control correlithm objects in the first input row of the control table;
identifying a particular control correlithm object in the first input row of the control table that has a smallest n-dimensional distance to the first input stimulus correlithm object;
determining that the smallest n-dimensional distance is within a predetermined n-dimensional distance threshold;
determining a particular column in which the identified correlithm object resides; and
outputting an output stimulus correlithm object corresponding to the determined column.

9. The method of claim 8, wherein the determined n-dimensional distances comprise Hamming distances.

10. The method of claim 8, wherein the n-dimensional distance threshold comprises a predetermined number of standard deviations of n-dimensional distance.

11. The method of claim 8, further comprising outputting a second input stimulus correlithm object comprising an n-bit digital word, and wherein:
the control table further comprises a second input row corresponding to a source of the second input stimulus correlithm object and comprising a third control correlithm object corresponding to the first column and a fourth correlithm object corresponding to the second column;
the output stimulus correlithm object comprises a first output stimulus correlithm object;
the method further comprising:
receiving the second input stimulus correlithm object;
determining n-dimensional distances between the second input stimulus correlithm object and each of the control correlithm objects in the second input row of the control table;
identifying the control correlithm object in the second input row of the control table that has the smallest n-dimensional distance to the second input stimulus correlithm object;
determining that the smallest n-dimensional distance is within the predetermined n-dimensional distance threshold;
determining the column in which the identified control correlithm object resides; and
outputting a second output stimulus correlithm object corresponding to the determined column.

12. The method of claim 11, wherein the output stimulus correlithm object represents a desirability condition.

13. The method of claim 11, wherein the output stimulus correlithm object represents an undesirability condition.

14. A device configured to emulate a node in a correlithm object processing system, comprising:
a first stimulus sensor implemented by a processor and configured to output a first input stimulus correlithm object comprising an n-bit digital word;
a second stimulus sensor implemented by the processor and configured to output a second input stimulus correlithm object comprising an n-bit digital word;
a memory operable to store a control table that comprises:
a first column corresponding to a first stimulus condition;
a second column corresponding to a second stimulus condition;
a first input row corresponding to the first stimulus sensor and comprising a first control correlithm object corresponding to the first column and a second control correlithm object corresponding to the second column;

a second input row corresponding to the second stimulus sensor and comprising a third control correlithm object corresponding to the first column and a fourth control correlithm object corresponding to the second column;

an output row comprising a first output stimulus correlithm object corresponding to the first column and a second output stimulus correlithm object corresponding to the second column;

a control node communicatively coupled to the first stimulus sensor, the second stimulus sensor and the memory, the control node implemented by the processor and configured to:

receive the first input stimulus correlithm object;

determine a first Hamming distance between the first input stimulus correlithm object and a particular control correlithm object in the first input row of the control table corresponding to the first column;

receive the second input stimulus correlithm object;

determine a second Hamming distance between the second input stimulus correlithm object and a particular control correlithm object in the second input row of the control table corresponding to the first column;

add the first Hamming distance the second Hamming distance to generate a first column Hamming distance composite value;

determine a third Hamming distance between the first input stimulus correlithm object and a particular control correlithm object in the first input row of the control table corresponding to the second column;

determine a fourth Hamming distance between the second input stimulus correlithm object and a particular control correlithm object in the second input row of the control table corresponding to the second column;

add the third Hamming distance the fourth Hamming distance to determine a second column Hamming distance composite value;

determine which of the first column Hamming distance composite value and the second column Hamming distance composite value is smaller;

determine that the smaller Hamming distance composite value is within a predetermined n-dimensional distance threshold; and output an output stimulus correlithm object corresponding to the column associated with the smaller Hamming distance composite value.

15. The device of claim 14, wherein the n-dimensional distance threshold comprises a predetermined number of standard deviations of n-dimensional distance.

16. The device of claim 14, wherein the output stimulus correlithm object represents a desirability condition.

17. The device of claim 14, wherein the output stimulus correlithm object represents an undesirability condition.

18. The device of claim 14, wherein the first stimulus sensor is configured to:

receive real world data;

access a sensor table that links real world data with input stimulus correlithm objects; and determine the first input stimulus correlithm object in conjunction with accessing the sensor table using the received real world data.

* * * * *